US012699061B2

(12) United States Patent
Wagner et al.

(10) Patent No.: US 12,699,061 B2
(45) Date of Patent: Aug. 4, 2026

(54) HIGH-THROUGHPUT HIGH-PRESSURE SMALL-ANGLE NEUTRON SCATTERING SAMPLE CELLS AND ENVIRONMENTS

(71) Applicant: STF Technologies LLC, Newark, DE (US)

(72) Inventors: Norman J. Wagner, Newark, DE (US); Richard Dombrowski, Lutherville, MD (US); Susana Cristina Marujo Teixeira, Gaithersburg, MD (US); Hannah Nevel, Newark, DE (US)

(73) Assignee: STF Technologies LLC, Newark, DE (US)

( * ) Notice: Subject to any disclaimer, the term of this patent is extended or adjusted under 35 U.S.C. 154(b) by 368 days.

(21) Appl. No.: 18/439,505

(22) Filed: Feb. 12, 2024

(65) Prior Publication Data

US 2024/0272096 A1 Aug. 15, 2024

Related U.S. Application Data

(60) Provisional application No. 63/484,645, filed on Feb. 13, 2023.

(51) Int. Cl.
*G01N 23/20* (2018.01)
*G01N 23/20041* (2018.01)
*G01N 23/202* (2006.01)

(52) U.S. Cl.
CPC ..... *G01N 23/20041* (2013.01); *G01N 23/202* (2013.01); *G01N 2223/054* (2013.01); *G01N 2223/106* (2013.01); *G01N 2223/311* (2013.01)

(58) Field of Classification Search
CPC ........... G01N 23/20041; G01N 23/202; G01N 2223/106; G01N 2223/054; G01N 2223/311
See application file for complete search history.

(56) References Cited

U.S. PATENT DOCUMENTS

2006/0144126 A1* 7/2006 O'Brien ................. G01N 21/51
                                                                73/28.01
2018/0202967 A1* 7/2018 Hsieh ............... G01N 27/44721

OTHER PUBLICATIONS

Bonetti & Calmettes, "High-pressure cell for small- and medium-angle neutron scattering measurements up to 300 MPa" Review of Scientific Instruments 75(2) (2004) 440-444.
(Continued)

*Primary Examiner* — Nicole M Ippolito
(74) *Attorney, Agent, or Firm* — Medler Ferro Woodhouse & Mills PLLC

(57) ABSTRACT

High-throughput high-pressure (HT HP) sample cells and sampling environments are disclosed herein. The HT HP sample cells include a top cell member and a bottom cell member that can be sealed together enclosing a sample in a pressure transmitter chamber. Further, the HT HP sample cells include a compressible, circular internal separator for compressing a sub-mL soft matter liquid sample. Further, the radiation beam windows of the HT HP sample cells are integral to the HT HP sample cell members. The novel and innovative HT HP sample cell design enables SANS measurements of the soft matter liquid sample when exposed to extreme temperatures and pressures without exhibiting leakage or cross-contamination of the soft matter liquid sample with the pressurizing fluid. Methods for using the HT HP sample cells in a pressurizing system for SANS analysis are also disclosed.

20 Claims, 6 Drawing Sheets

(56) References Cited

OTHER PUBLICATIONS

Bridgman, "Water, in the Liquid and Five Solid Forms, under Pressure" Proceedings of the American Academy of Arts and Sciences 47(13) (1912) 441-558.

Casadei et al., "Neutron cryo-crystallography captures the protonation state of ferryl heme in a peroxidase" Science345, 193-197 (2014).

Chodankar et al., "Small angle neutron scattering studies on protein denaturation induced by different methods" Pramana 71(5) (2008) 1021-1025.

Crommelin et al., "Addressing the Cold Reality of mRNA Vaccine Stability" Journal of Pharmaceutical Sciences 110(3) (2021) 997-1001.

De Maria et al., "Effects of high hydrostatic pressure on the conformational structure and the functional properties of bovine serum albumin" Innovative Food Science & Emerging Technologies 33 (2016) 67-75.

Edwards et al., "Cold sensitivity of the SARS-CoV-2 spike ectodomain" Nature Structural & Molecular Biology 28(2) (2021) 128-131.

Eich et al., "Clamp cells for high pressure neutron scattering at low temperatures and high magnetic fields at Heinz Maier-Leibnitz Zentrum (MLZ)" High Pressure Research 41 (1) (2021) 88-96.

Haberl et al., "Modified Bridgman anvils for high pressure synthesis and neutron scattering" High Pressure Research 39(3) (2019) 426-437.

He et al., "Conformational changes in Sindbis virus induced by decreased pH are revealed by small-angle neutron scattering" J Virol 86(4) (2012) 1982-7.

Heller et al., "The Bio-SANS instrument at the High Flux Isotope Reactor of Oak Ridge National Laboratory" Journal of Applied Crystallography 47(4) (2014) 1238-1246.

Leal et al, "Absorption correction based on a three-dimensional model reconstruction from visual images" Journal of Applied Crystallography41, 729-737 (2008).

Lietor-Santos et al., "Structural changes of poly(N-isopropylacrylamide)-based microgels induced by hydrostatic pressure and temperature studied by small angle neutron scattering" J Chem Phys 133(3) (2010) 034901.

Rai et al., "High-pressure small-angle X-ray scattering cell for biological solutions and soft materials" Journal of Applied Crystallography 54(1) (2021) 111-122.

Rivalain et al., "Development of high hydrostatic pressure in biosciences: Pressure effect on biological structures and potential applications in Biotechnologies" Biotechnology Advances 28(6) (2010) 659-672.

Rosa et al., "Connecting high-temperature and low-temperature protein stability and aggregation" Plos One 12(5) (2017) e0176748.

Sanfelice & Temussi, "Cold denaturation as a tool to measure protein stability" Biophysical Chemistry 208 (2016) 4-8.

Schermeyer et al., "Characterization of highly concentrated antibody solution—A toolbox for the description of protein long-term solution stability" mAbs 9(7) (2017) 1169-1185.

Semeraro et al., "Increasing complexity in small-angle X-ray and neutron scattering experiments: from biological membrane mimics to live cells" Soft Matter 17(2) (2021) 222-232.

Teixeira et al., "New sources and instrumentation for neutrons in biology" Chemical Physics 345, 133-151 (2008).

Teixeira et al., "Sweet neutron crystallography" Acta Crystallographica Section D-Biological Crystallography66, 1139-1143 (2010).

Teixeira et al., "High pressure cell for Bio-SANS studies under sub-zero temperatures or heat denaturing conditions" Journal of Neutron Research 20(6) (2018) 13-23.

Teixeira, "High-pressure small-angle neutron scattering for food studies" Current Opinion in Colloid & Interface Science 42 (2019) 99-109.

Wang & Roberts, "Non-Arrhenius protein aggregation" The AAPS journal 15(3) (2013) 840-851.

Wood et al., "QUOKKA, the pinhole small-angle neutron scattering instrument at the OPAL Research Reactor, Australia: design, performance, operation and scientific highlights" Journal of Applied Crystallography 51(2) (2018) 294-314.

Yang et al., "A comprehensive review on sub-zero temperature cold thermal energy storage materials, technologies, and applications: State of the art and recent developments" Applied Energy 288 (2021) 116555.

Ando et al., "High hydrostatic pressure small-angle X-ray scattering cell for protein solution studies featuring diamond windows and disposable sample cells" J. Appl. Cryst. 41 (2008) 167-175.

Annighöfer et al., "A high pressure cell using metallic windows to investigate the structure of molecular solutions up to 600 MPa by small-angle neutron scattering" Review of Scientific Instruments 90(2) (2019) 025106.

Ashkar et al., "Neutron scattering in the biological sciences: progress and prospects" Acta Crystallographica Section D 74(12) (2018) 1129-1168.

Bonetti & Calmettes, "Sapphire-anvil cell for small-angle neutron scattering measurements in large-volume liquid samples up to 530 MPa" Review of Scientific Instruments 76(4) (2005) 043903.

Cheng et al., "Ni—Cr—Al Alloy for neutron scattering at high pressures" Materials Science and Technology 36(9) (2020) 949-954.

Das et al., "Small Angle Scattering Study of the Structure and Organization of RNAs and Protein of Brome Mosaic Virus (BMV) Capsid Protein" Physics Procedia 60 (2014) 101-109.

Dumard et al., "Full inactivation of human influenza virus by high hydrostatic pressure preserves virus structure and membrane fusion while conferring protection to mice against infection" PLoS One 8(11) (2013) e80785.

Glinka et al., "The 30 m Small-Angle Neutron Scattering Instruments at the National Institute of Standards and Technology" J. Appl. Cryst. 31 (1998) 430-435.

Jackson & McGillivray, "Protein aggregate structure under high pressure" Chemical Communications 47(1) (2011) 487-489.

Kim et al., "Computational investigation of cold denaturation in the Trp-cage miniprotein" Proceedings of the National Academy of Sciences 113(32) (2016) 8991.

Kohlbrecher et al., "A high pressure cell for small angle neutron scattering up to 500MPa in combination with light scattering to investigate liquid samples" Review of Scientific Instruments 78(12) (2007) 125101.

Lazar et al., "Cold denaturation of monoclonal antibodies" mAbs 2(1) (2010) 42-52.

Mainardes & Evangelista, "PLGA nanoparticles containing praziquantel: effect of formulation variables on size distribution" International Journal of Pharmaceutics 290(1) (2005) 137-144.

Masson et al., "High-Pressure Biotechnology in Medicine and Pharmaceutical Science" Journal of biomedicine & biotechnology 1(2) (2001) 85-88.

Roche & Catherine, "Lessons from pressure denaturation of proteins" Journal of the Royal Society Interface 15(147) (2018) 20180244.

Silva et al., "Pressure-inactivate virus: a promising alternative for vaccine production" in: K. Akasaka, H. Matsuki (Eds.) High Pressure Bioscience. Subcellular Biochemistry, Springer, Dordrecht, 2015.

Stoel et al., "Innate Responses Induced by Whole Inactivated Virus or Subunit Influenza Vaccines in Cultured Dendritic Cells Correlate with Immune Responses In Vivo" Plos One 10(5) (2015).

Sundqvist & Tolpygo, "Saturation and pressure effects on the resistivity of titanium and two Ti—Al alloys" Journal of Physics and Chemistry of Solids 122 (2018) 41-50.

Takeno et al., "High Pressure Cell for Small-Angle Neutron and Light Scattering Studies of Phase Transitions in Complex Liquids" Polymer Journal 29(11) (1997) 931-939.

Wälchli et al., "Accelerated Aggregation Studies of Monoclonal Antibodies: Considerations for Storage Stability" Journal of Pharmaceutical Sciences 109(1) (2020) 595-602.

Winter, "Interrogating the Structural Dynamics and Energetics of Biomolecular Systems with Pressure Modulation" Annual Review of Biophysics 48(1) (2019) 441-463.

Yang et al., "Computational Probing of Temperature-Dependent Unfolding of a Small Globular Protein: From Cold to Heat Dena-

(56)          References Cited

OTHER PUBLICATIONS turation" Journal of Chemical Theory and Computation 17(1) (2021) 515-524.

* cited by examiner

300

335

312

312

315

155

100

310

305

HIGH-THROUGHPUT HIGH-PRESSURE SMALL-ANGLE NEUTRON SCATTERING SAMPLE CELLS AND ENVIRONMENTS

CROSS REFERENCE TO RELATED APPLICATION

This application claims the benefit of U.S. Provisional Application No. 63/484,645, filed Feb. 13, 2023, the entire content of which is incorporated by reference herein.

FIELD OF THE INVENTION

The present invention relates to high-throughput high-pressure sample cells and systems for analysis of soft matter samples. In particular, high-throughput high-pressure sample cells are provided that enable the measurement of soft matter liquid samples under extreme temperature and pressure without leaking or sample contamination.

BACKGROUND OF THE INVENTION

Pressure is a measurable thermodynamic property with a central role in molecular stability and phase behavior of any material. High-pressure (here referring to 50 MPa or higher) is prevalent in the biosphere as well as in industry, for example, in homogenizers used in Biotechnology and Food industries, or pressure-assisted freezing/thawing treatments. Unlike temperature, where gradients are formed before thermal equilibrium is reached, pressure is felt instantly by the entire volume, independently of sample size or shape, making it a desirable parameter to access effects of relatively extreme environments for structural studies. Small angle neutron scattering (SANS) is a technique commonly used to probe structural properties of soft-matter, due to the non-destructive nature of the neutrons: the fact that SANS causes no radiation damage is of critical importance for systematic, bias-free studies under broad ranges of magnetic field, pressure or temperature stresses of interest. Studies of environmental effects, hysteresis and stability are further enabled by the penetrating power of neutrons, allowing, e.g., for measurements inside pressure-resistant and neutron-transparent vessels. Despite being a low-resolution technique, the information accessible to SANS can extend to the molecular level, due to measurable differences in scattering contributions from different average elemental compositions. Thus, these measurable differences provide the contrast between, for example, proteins and lipids in large macromolecular assemblies—as well as to enhanced sensitivity to larger scattering objects, such as those found in aggregation or self-assembly mechanisms. SANS measurements provide actionable knowledge on degradation mechanisms of biomolecule solutions in conditions of interest to processing and storage of materials in pharmaceutical and food industries.

It is a common misconception that high pressure is a rare non-physiological environment for biopolymers: piezophiles (including fish) thrive under pressure, and high pressure is prevalent in industrial settings. For sterilization of heat-sensitive biopharmaceuticals and food, high pressure (HP) processing is now a mature technology accepted as an energy-efficient alternative to pasteurization or additives. Inadvertently, high pressure is also induced during lyophilization and in freezers worldwide: pH and concentration shifts are well known to occur, but the mechanical stresses and induced pressures are often overlooked as major aggregation triggers. Most commercial and research grade biopolymers are lyophilized or stored in freezers, where they are exposed to cryoconcentration, cold denaturation and freeze/thaw cycles. Given that the effects of freeze/thaw cycles are generally unknown, many biopolymers must be used immediately or discarded.

The soft matter and biology scientific communities have an identified need for a high-throughput high pressure small angle neutron scattering (HT HP SANS) sample environment available on national beamlines. The available high-pressure systems for small angle neutron scattering (HP-SANS) are not well suited for solutions of biopolymers, especially proteins, due to poor or no temperature control, the need for relatively large sample volumes, and the expertise required with operating non-standard HP equipment. Characterization of biopolymer solutions requires the ability to screen a broad range of conditions to support formulation design and improved performance under broad environmental conditions. Difficulty in obtaining sufficient beamtime and poor pressure cell reliability are often pointed by users as major obstacles in using HP-SANS to study biopolymers.

Thus, there remains a need in the art for sample measurement devices and systems capable of HT HP analysis of soft matter liquid samples under extreme temperatures and/or pressures.

SUMMARY OF THE INVENTION

Described herein is a novel sample cell design composed of two cell members that assemble to form a pressure cell. The pressure cell includes a pressure transmitter chamber for applying compression to a soft matter liquid sample to allow for the collection of radiation scattering data, such as, but not limited to small angle neutron scattering (SANS), in order to assess the soft matter's sensitivity to such pressure. Within the pressure transmitter chamber is a compressible, circular internal separator in which the soft matter liquid sample is deposited in amounts as small as sub-mL. The HT HP sample cell delivers pressurizing fluid, such as water under pressure, to the pressure transmitter chamber, which pressure is translated by the compressible, circular internal separator to the soft matter liquid sample. The combination of the pressure transmitter chamber components and integrated radiation beam windows of the HT HP sample cells enable radiation scattering data to be collected at extreme temperature and/or pressure conditions without the liquid sample leaking out of the chamber, failure of the compressible, circular internal separator, or cross-contamination between the liquid sample and the pressurizing fluid.

In a preferred embodiment, these HT HP sample cells are configured for simultaneous high pressure and extreme temperature environments. The pressure transmitter chamber can be pressurized up to about 220 MPa, and can reach the desired pressure in 10 minutes or less. Further, the workable temperature range of the HT HP sample cells of the invention range from about −21° C. to about 90° C. Finally, the HT HP sample cells described herein may be designed for compatibility with automated sample holders, such as Peltier-driven SANS sample holders, currently used in beamline centers worldwide. The HT HP sample cells described herein will be pivotal to enable significantly faster data collection at subzero Celsius temperatures. This novel and innovative HT-HP-SANS system fills a critical gap—routine measurements for low temperature under pressure—providing an opportunity for a big leap in the scientific impact that HP-SANS can make for the studies of food and pharmaceutical samples.

One aspect of the invention features a high-throughput, high-pressure (HT HP) sample cell for connection to a pressure system for measuring radiation scattering of a soft matter liquid sample under pressure. The HT HP sample cells includes a pressure transmitter chamber with a compressible, circular internal separator member as well as an enclosure having a top cell member and a bottom cell member. The top cell member has a first outer surface, a first inner surface, and a circular beam recess in the first outer surface and oriented perpendicularly to the first outer surface and first inner surface. The circular beam recess includes a beam entrance window. The bottom cell member has a second outer surface, a second inner surface, a circular sample recess in the second inner surface and oriented perpendicularly to the second outer surface and second inner surface, and a pressure fluid delivery hole. The circular sample recess includes the beam exit window. The HT HP sample cell also includes a pressure fluid inlet port for connecting the sample cell to a supply of pressurizing fluid and in fluid communication with the pressure fluid delivery hole for delivering the supply of pressurizing fluid to the circular sample recess. In this aspect, the compressible, circular internal separator member is disposed within the circular sample recess and makes contact with the beam exit window. Further, the compressible, circular internal separator member is configured for receiving a soft matter liquid sample and for applying compression to the soft matter liquid sample when pressurized fluid is delivered to the circular sample recess.

In an embodiment, the beam entrance window is integral to the top cell member, the beam exit window is integral to the bottom cell member, or both the beam entrance window is integral to the top cell member and the beam exit window is integral to the bottom cell member. In another embodiment, the pressure transmitter chamber further comprises a circular pressure distributor having a plurality of holes for flowing pressurizing fluid, which is disposed within the circular sample recess and between the compressible, circular internal separator member and the pressure fluid delivery hole. In other embodiments, the outer diameter of the compressible, circular internal separator is less than the inner diameter of the circular pressure distributor. In yet other embodiments, the inner diameter of the compressible, circular internal separator is at least about 10 mm. Also, the diameter of the circular beam recess may be less than the diameter of the circular sample recess so that it can be inserted into the circular sample recess when the HT HP sample cell is assembled.

In one embodiment, the compressible, circular internal separator of the HT HP sample cell has a cross-sectional compression of about 10% to about 30%. The compressible, circular internal separator may also be made from a fluoroelastomer, silicone, or a nitrile butadiene rubber. In some embodiments, the compressible, circular internal separator comprises a fluorine content from about 50% to about 80%. For instance, the compressible, circular internal separator may be made from a combination of vinylidene fluoride, hexafluoropropylene, and tetrafluoroethylene having a durometer of at least 90.

In another embodiments, the beam entrance window, the beam exit window, or both, are made of a a material and have a thickness with a neutron transmission of about 50% to about 99% for a neutron beam of wavelength 6 angstroms. For instance, the top cell member, the bottom cell member, or both the top cell member and the bottom cell member may be constructed from a titanium alloy, a copper alloy, or an aluminum alloy. In one particular embodiment, the cell members are constructed from a titanium alloy, such as, but not limited to, $TiAl_6V_4$ titanium alloy Grade 5.

In an embodiment, the HT HP sample cell has a maximum working hydrostatic pressure of about 220 MPa and/or a workable temperature range from about −21° C. to about 90° C. The HT HP sample call may be connected to a supply of pressurized fluid as well as a temperature control member. In a preferred embodiment, pressure and temperature are simultaneously controlled. In another embodiment, the HT HP sample cell is connected to a small angle neutron scattering sample environment, and a soft matter liquid sample is disposed within the compressible, circular internal separator member so that the beam entrance window can receive an incident beam of neutron radiation, which is scattered by the soft matter liquid sample and exits the beam exit window for detection by a detector member. In yet other embodiments, the pressurized fluid inlet port of the HT HP sample cell is connected to a threaded male connector.

Another aspect of the invention features a high-pressure fluid system and radiation beamline sampling environment that includes a control system, manifold, pressure pump, a supply of pressurizing fluid, one or more remotely-controlled pressure valves, a sample cell holder, a source of neutron radiation, and a radiation detector. When activated, the source of neutron radiation produces an incident beam of radiation. The pressure pump and remotely controlled-valves are connected to the manifold by tubing. The supply of pressurizing fluid is connected to and pressurized by the pressure pump. Both the remotely-controlled valves and the sample cell holder are in communication with the control system. In this aspect, the sample cell holder can hold one or more of the HT HP sample cells described above and is configured for equilibrating temperature of the one or more HT HP sample cells. The pressure pump causes the supply of pressurizing fluid to enter the manifold, and the control system causes the one or more remotely-controlled pressure valves to flow the pressurizing fluid to the one or more HT HP sample cells. Further, the control system can cause the sample cell holder to equilibrate the temperature of the one or more HT HP sample cells. In this manner the control system can regulate the pressure and/or temperature of the one or more HT HP sample cells. The control system can also cause the sample cell holder to translate movement of each of the HT HP sample cells into the incident beam of radiation in succession.

In one embodiment, a soft matter liquid sample disposed within each of the HT HP sample cells. In another embodiment, the control system causes the sample cell holder to equilibrate the temperature of a first HT HP sample cell and the pressure control valves to pressurize the first HT HP sample cell. In other embodiments, the incident beam of radiation is scattered by the soft matter liquid sample in a first HT HP sample cell and detected by the radiation detector, and the control system causes the sample cell holder to equilibrate the temperature of a second HT HP sample cell and the pressure control valves to pressurize the second HT HP sample cell, and also causes the sample cell holder to move the second HT HP sample cell into the incident beam of radiation. The high-pressure fluid system and radiation beamline sampling environment is capable of delivering pressurizing fluid to the one or more HT HP sample cells up to a maximum hydrostatic pressure of about 220 MPa and/or equilibrating the temperature of the one or more HT HP sample cells to a temperature in the range of about −21° C. to about 90° C. In an embodiment, 1 to 9 HT HP sample cells are disposed in the sample cell holder. In another embodiment, the incident beam of radiation is a neutron beam used for small angle neutron scattering.

The invention also features a method of analyzing a soft matter liquid sample under extreme temperature and pressure, which includes the steps of: (a) providing the high-pressure fluid system and radiation beamline sampling environment described above; (b) disposing a soft matter liquid sample into each of the HT HP sample cells; (c) equilibrating the temperature of a first of the HT HP sample cells to a temperature from about −21° C. to 90° C., or delivering pressurizing fluid to the first of the HT HP sample cell to reach of pressure of up to about 220 MPa, or both; (d) translating the first of the HT HP sample cells to a radiation beam position and applying a beam of neutron radiation to the first of the HT HP sample cells; and (e) detecting a first neutron scattering image from the first of the HT HP sample cells. In some aspects, the method includes the additional steps of: (e) either before, during, or after step (d), equilibrating the temperature of a second of the HT HP sample cells to a temperature from about −21° C. to 90° C., or delivering pressurizing fluid to the second of the HT HP sample cells to reach of pressure of up to about 220 MPa, or both; (f) detecting a first neutron scattering image from the first of the HT HP sample cells; (g) translating movement of the second HT HP sample cell into the radiation beam position and applying a beam of neutron radiation to the second of the HT HP sample cells; and (h) detecting a second neutron scattering image from the second of the HT HP sample cells.

In one embodiment of the method, steps c-h are repeated for up to 9 HT HP sample cells. In another embodiment, the temperature of at least one of the HT HP sample cells is equilibrated to about −21° C. and/or the pressure of at least one of the HT HP sample cells is about 220 MPa.

Other features and advantages of the invention will be apparent by reference to the drawings, detailed description, and examples that follow.

Panel G is an exploded view of the circular sample recess showing the internal separator, the pressure distributor, and sealing member.

Figure 4:
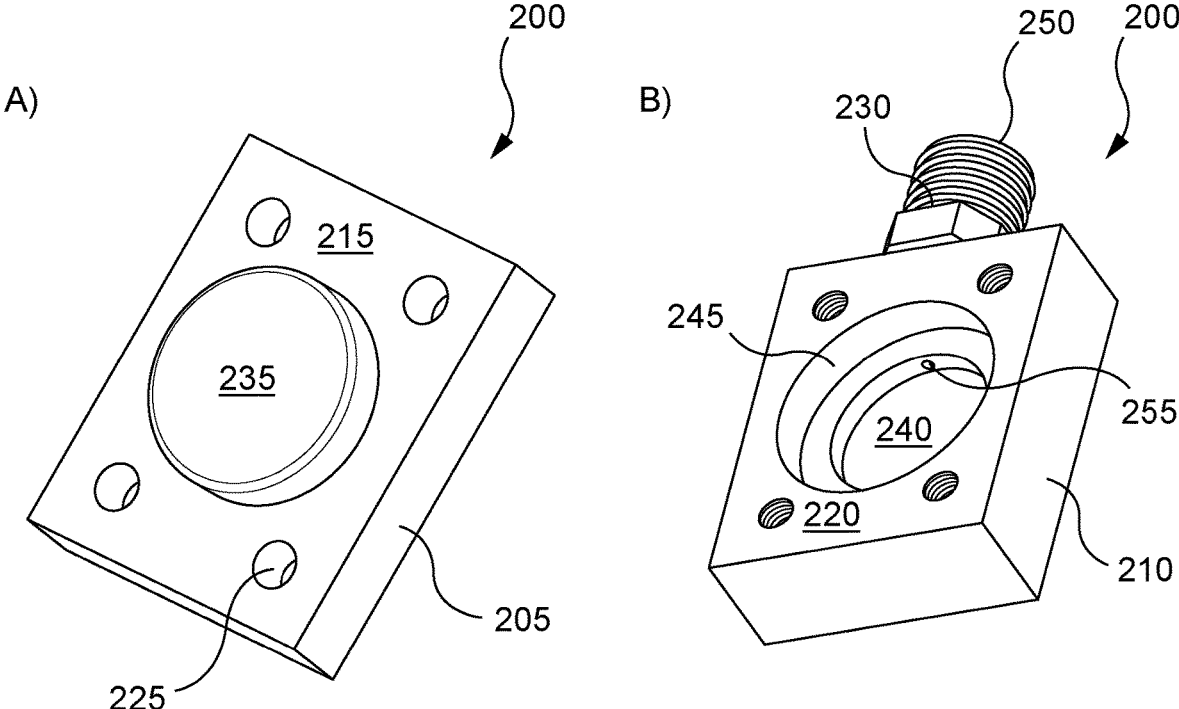

FIG. 4 depicts an exemplary HT HP sample cell with a male connector. Panel A is view of the inner surface of the top cell member. Panel B is a view of the inner surface of the bottom cell member.

Figure 5:
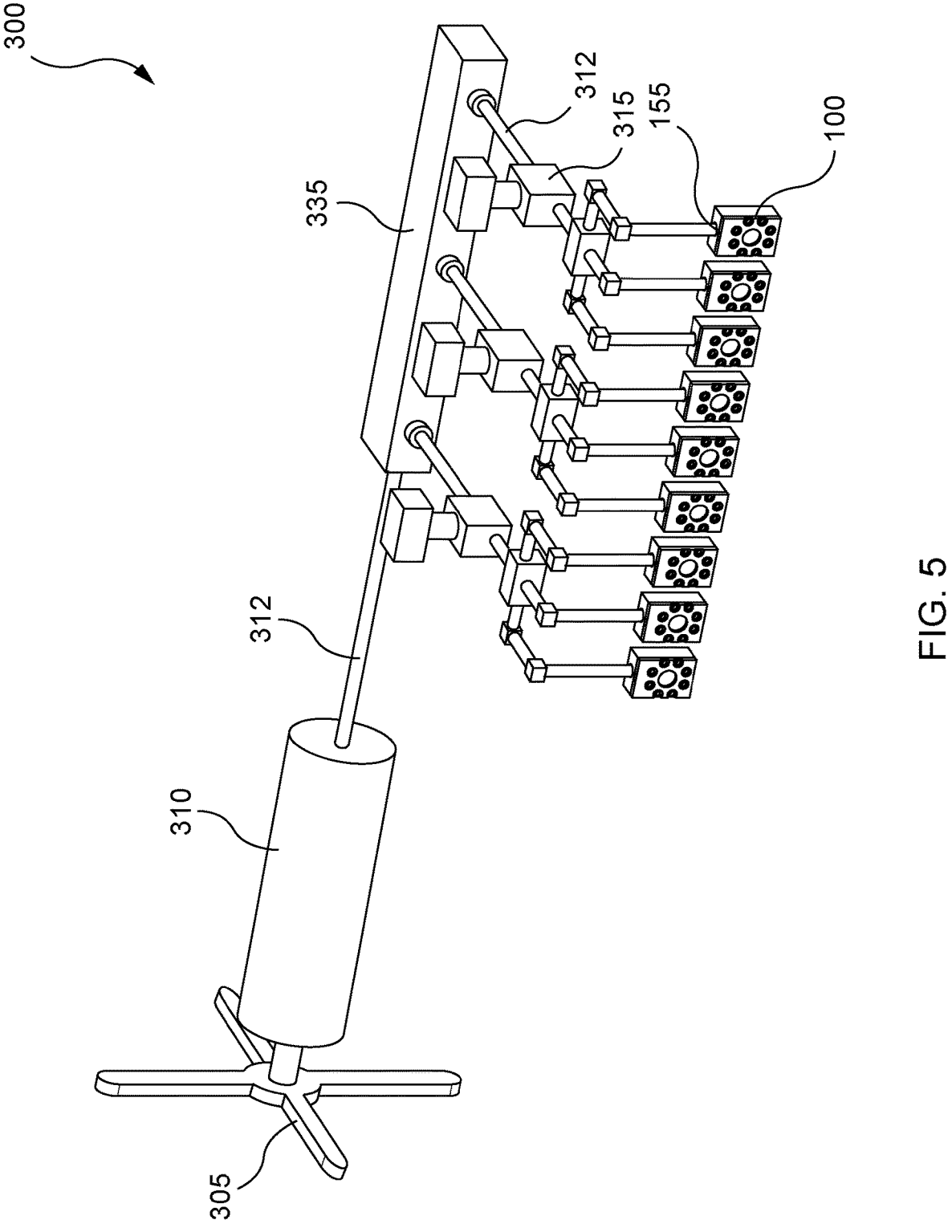

FIG. 5 is a perspective view of a pressure and temperature control system.

Figure 6:
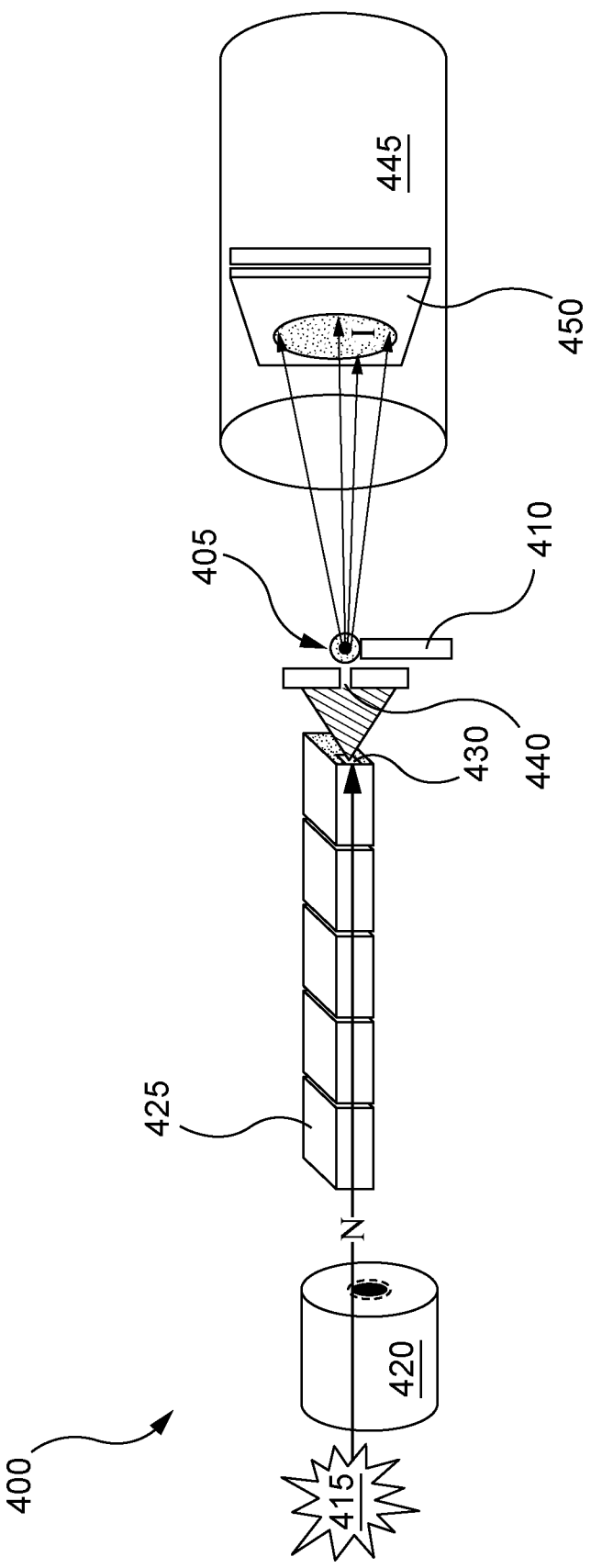

FIG. 6 is a diagram of an HT HP SANS environment.

DETAILED DESCRIPTION OF THE INVENTION

Described herein are novel designs for sample cells and sampling environments suitable for high-throughput high-pressure (HT HP) radiation scattering analysis, such as small angle neutron scattering (SANS), of soft matter liquid samples. In particular, the innovative HT HP sample cells and sampling environments described herein allow, for the first time, the collection of SANS measurements from a soft matter liquid sample in sub-mL concentrations when exposed to extreme temperature and pressure conditions. As described in further detail below, the HT HP sample cell designs of the invention have a working hydrostatic pressure capability of up to 220 MPa, allowing exposure of the soft matter liquid sample to high pressure without leaking of the sample out of the cell, failure of the internal separator, or contamination of the sample with the pressurizing liquid. Further, the HT HP sample cells of the invention have a workable temperature range from between about −21° C. and about 90° C., enabling exposure of the sample to an extreme temperature environment (e.g., sub-zero C), also without leaking of the sample out of the cell. In fact, the HT HP sample cells enable simultaneous sample exposure to extreme temperatures and pressures. As such, the invention provides an opportunity for a big leap in the scientific impact that HP-SANS can make for the studies of food and pharmaceutical samples.

In general, the HT HP sample cell will include two halves or members that, when assembled, form the HT HP sample cell. The HT HP sample cells include a top cell member and a bottom cell member. The top cell member includes a circular beam recess in the outer surface that protrudes from the inner surface to create a cylindrical component ending with a beam entrance window. The circular beam recess and beam entrance window are configured to receive an incident beam of radiation when used in a beamline analysis. The HT HP sample cells also include a bottom cell member that has a circular sample recess in the inner surface that extends into the inner surface and has as bottom surface that functions as a radiation beam exit window. Further, a pressure transmitter chamber is contained within this circular sample recess, which includes a compressible, circular internal separator, such as, but not limited to, an O-ring. In preferred embodiments, the pressure transmitter chamber also includes a pressure distributer in the form of a circular wall that is disposed within the circular sample recess and on the beam exit window. In this embodiment, the compressible, circular internal separator is positioned within the pressure distributer forming a concentric arrangement. Finally, the bottom cell member includes a pressure fluid inlet port that leads to an opening in the circular sample recess and functions to flow pressurizing fluid into the sample cell.

In operation, a soft matter liquid sample is deposited (e.g., in sub-mL amounts) into the interior of the compressible, circular internal separator, and the top cell member and bottom cell member are sealed via, e.g., torqued bolts. The arrangement of this HT HP sample cell design provides for a tightly sealed pressure transmitter chamber with a beam entrance window at one end, and the beam exit window at the other. The circular beam recess and circular sample recess are designed to create a small separation in which the pressure transmitter chamber and liquid sample reside during analysis, while limiting the amount sample cell material the radiation beam must penetrate. Then, pressurizing fluid can be introduced to the pressure transmitter chamber and distributed across the circumferential outer surface of the compressible, circular internal separator. In preferred embodiments, a pressure distributor is included to ensure even distribution of the pressurizing fluid across the circumferential outer surface of the compressible, circular internal separator. The HT HP sample cell is capable of pressures of up to 220 MPa, and can reach the desired pressure in 10 minutes or less. The pressurized fluid then compresses the compressible, circular internal separator, which translates this compression to the soft matter liquid sample. Similarly, the HT HP sample cell can then be heated to extreme temperatures ranging from about −21° C. to about 90° C.

Then, the HT HP sample cell is placed into the beamline of a, e.g., SANS sampling environment. The incident radiation travels through the beam entrance window and to the sample, which partially scatters the radiation beam. Upon exiting the beam exit window, the scattered radiation is then detected via an art-standard radiation detector to provide information about the sensitivity of the sample to extreme temperatures and/or pressures. In preferred embodiments, both the beam entrance window and the beam exit window are integral to the top cell member and bottom cell member, respectively. This combination of components allows for the collection of radiation scattering data from a soft matter liquid sample simultaneously exposed to extreme temperatures and/or pressures without the soft matter liquid sample leaking out of the sample cell, or the pressurizing fluid leaking into the inner portion of the compressible, circular internal separator thereby contaminating the soft matter liquid sample.

In addition, the HT HP sample cells described herein are designed for compatibility with beamline sampling environments available in the art. In one embodiment, provided herein is a novel and innovative SANS sampling environment that includes a 9-cell sample holder translatable in response to remote control. The SANS environment includes one or more two-way remotely controlled pressure valves for controlling the flow of pressurized fluid to one or more of the HT HP sample cells. Further, the center's sample holder equilibrates the temperature of one or more of the HT HP sample cells, which are capable of withstanding temperatures as low as −21° C. without cell failure. Importantly, this system allows for precise control of each HT HP sample cell at a different temperature and/or pressure to enable high-throughput scattering analysis of the soft matter liquid sample under a variety of conditions.

Definitions

Unless defined otherwise, all technical and scientific terms used herein have the same meaning as those commonly understood by one of ordinary skill in the art to which this invention belongs. Standard techniques are used unless otherwise specified. Although methods and materials similar or equivalent to those described herein can be used in the practice or testing of the present disclosure, suitable methods and materials are described below. The materials, methods and examples are illustrative only, and are not intended to be limiting. All publications, patents and other documents mentioned herein are incorporated by reference in their entirety.

Ranges, if used, are used as shorthand to avoid having to list and describe each and every value within the range. Any value within the range can be selected, where appropriate, as the upper value, lower value, or the terminus of the range.

As used herein, the singular forms "a," "an," and "the" include the plural referents unless the context clearly indicates otherwise. Likewise, the terms "include", "including", and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "about" refers to the variation in the numerical value of a measurement, e.g., diameter, weight, length, pressure, temperature, volume, angle degrees, etc., due to typical error rates of the device used to obtain that measure. In one embodiment, the term "about" means within 5% of the reported numerical value, preferably, the term "about" means within 3% of the reported numerical value.

The term "comprising" is intended to include embodiments encompassed by the terms "consisting essentially of" and "consisting of" Similarly, the term "consisting essentially of" is intended to include embodiments encompassed by the term "consisting of."

The term "scattering" as used herein refers to a general physical process where some forms of radiation, such as neutrons, are forced to deviate from a straight trajectory by one or more paths due to localized non-uniformities in the medium through which they pass.

The terms "small-angle neutron scattering" or "SANS" are used interchangeably herein to refer to a scattering technique using accelerated neutrons as the source of radiation. Preferably, the angle of deflection is between about 0.1 degrees and about 20 degrees; more preferably between about 0.1 degrees and about 10 degrees.

HT HP Sample Cell

Provided herein are novel and innovative HT HP sample cells suitable for in situ measurements for the characterization of a soft matter liquid sample's (e.g., biomolecule) sensitivity to changes in environmental conditions, such as extreme temperatures and pressures. High pressure conditions (e.g., 50 MPa) are imposed on soft matter solutions in processes that include, but are not limited to, freeze/thawing, chromatography, crystallography, cryo-EM, cell lysis, protein folding, and the like. Pressure is a measurable thermodynamic property with a central role in molecular stability and phase behavior of any material, including biomolecules. Likewise, a better understanding of a biomolecule's response to extreme temperatures (e.g., subzero (° C.)) may assist in determining, for example, how long a biomolecule is stable during cold chain storage. The characterization of soft matter sensitivity to these extreme environments can be measured by exposing a soft matter liquid sample to a beam of radiation and detecting subtle changes in the beam, e.g., scattering, as it passes through the sample. As one having ordinary skill in the art would readily appreciate, when biomolecules and other materials are exposed to an incident beam of radiation, non-uniformities in these materials can force the radiation beam to deviate from the straight trajectory by one or more paths. This scattering, or deviation, of the radiation beam can be measured as scattering planes. These measurements can provide relevant information for describing structure/property relationships these materials. As will be explained in more detail below, the HT HP sample cells described herein enable high-throughput radiation scattering measurements from soft matter liquid samples to be collected in extreme temperature and/or extreme pressure environments with high signal-to-noise ratio and without leakage or sample contamination. Moreover, the HT HP sample cells of the invention are compatible with existing cell holders available at beamline research centers.

Temperature conditions are established by external cell holders used in beamline environments. In this manner, the HT HP sample cell and the soft matter liquid sample within can be exposed to temperatures ranging from about −21° C. to about 90° C., e.g., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 15° C., 20° C., 25° C., 30° C., 35° C., 40° C., 45° C., 50° C., 55° C., 60° C., 65° C., 70° C., 75° C., 80° C., 85° C., or 90° C. In a preferred embodiment, the HT HP sample cell is equilibrated to the desired temperature range within about 10 minutes or less, e.g., within about 10 minutes, or within about 8 minutes, or within about 5 minutes, or less. In some embodiments, the HT HP sample cell can be exposed to temperatures less than about 0° C.; or less than about −5° C., or less than about −10° C., or less than about −15° C., or less than about −20° C. without sample contamination or sample leakage. In one particular embodiment, the HT HP sample cell can be exposed to sub-zero temperatures as low as about −21° C. without sample leakage or contamination.

In addition, HT HP sample cell and the biomolecule sample within can be exposed to high pressure. The HT HP sample cells are connected to sampling environments that include an external pressure pump that delivers a pressurizing fluid, such as water, into the HT HP sample cell. In this manner, the HT HP sample cell enables the collection of radiation scattering data from soft matter liquid samples exposed to pressure ranging from about ambient to about 220 MPa, e.g., 0.1 MPa, 1 MPa, 5 MPa, 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, 165 MPa, 170 MPa, 175 MPa, 180 MPa, 185 MPa, 190 MPa, 195 MPa, 200 MPa, 205 MPa, 210 MPa, 215 MPa, or 220 MPa. The HT HP sample cell can reach the desired pressure in about 10 minutes or less, e.g., 10 m, 9 m, 8 m, 7 m, 6 m, 5 m, or less. In some embodiments, the HT HP sample cell can be exposed to pressures of at least about 50 MPa, or at least about 100 MPa, or at least about 150 MPa, or at least about 200 MPa, or at a maximum pressure of about 220 MPa without sample contamination or sample leakage. In preferred embodiments, the HT HP sample cell can be simultaneously exposed to temperatures less than about 0° C.; or less than about −5° C., or less than about −10° C., or less than about −15° C., or less than about −20° C. and high pressure of least about 50 MPa, or at least about 100 MPa, or at least about 150 MPa, or at least about 200 MPa, or at a maximum pressure of about 220 MPa without sample contamination or sample leakage.

To provide an efficient pathway for the radiation beam to pass through the walls of the sample cell without causing scattering due to the sample cell material itself, existing sample cells include one or more pairs of radiation beam windows, each of which may be comprised of a material particularly suitable for allowing radiation, such as neutron beams, to easily penetrate. Thus, materials suitable for the radiation beam windows for use with a neutron beam include, but are not limited to titanium, beryllium-quartz, aluminum, and plastic. However, the presence of these radiation beam windows tend to cause leakage of pressurized fluid and sample between the radiation beam windows and the cell sample walls when high pressure fluids (e.g., approaching 220 MPa) are delivered to the sample cell to measure the stress response of the soft matter liquid sample.

Therefore, to overcome this deficiency in the art, the HT HP sample cells described herein will have radiation beam windows that are integral to the sample cell. To accomplish this, the HT HP sample cell itself should be constructed from material having a combination of high radiation transmission (preferably, high neutron transmission), excellent mechanical properties, and commercial availability. Suitable materials enable the radiation beam windows to be machined into the walls of the sample cell itself, but still provide for the strength and integrity of the sample walls when exposed to very low or very high temperatures and/or high pressure. Suitable materials include, but are not limited to, materials having an ultimate tensile strength ("UTS") in the range from about 800 MPa to about 1500 MPa, e.g., 800 MPa, 810 MPa, 820 MPa, 830 MPa, 840 MPa, 850 MPa, 860 MPa, 870 MPa, 880 MPa, 890 MPa, 900 MPa, 910 MPa, 920 MPa, 930 MPa, 940 MPa, 950 MPa, 960 MPa, 970 MPa, 980 MPa, 990 MPa, 1,000 MPa, 1,010 MPa, 1,020 MPa, 1,030 MPa, 1,040 MPa, 1,050 MPa, 1,060 MPa, 1,070 MPa, 1,080 MPa, 1,090 MPa, 1,100 MPa, 1,110 MPa, 1,120 MPa, 1,130 MPa, 1,140 MPa, 1,150 MPa, 1,160 MPa, 1,170 MPa, 1,180 MPa, 1,190 MPa, 1,200 MPa, 1,210 MPa, 1,220 MPa, 1,230 MPa, 1,240 MPa, 1,250 MPa, 1,260 MPa, 1,270 MPa, 1,280 MPa, 1,290 MPa, 1,300 MPa, 1,310 MPa, 1,320 MPa, 1,330 MPa, 1,340 MPa, 1,350 MPa, 1,360 MPa, 1,370 MPa, 1,380 MPa, 1,390 MPa, 1,400 MPa, 1,410 MPa, 1,420 MPa, 1,430 MPa, 1,440 MPa, 1,450 MPa, 1,460 MPa, 1,470 MPa, 1,480 MPa, 1,490 MPa, or 1,500 MPa; preferably, the UTS is from about 900 MPa to about 1,200 MPa.

In addition to its UTS, a suitable material should have high radiation transmission properties. Radiation transmission is a function of both the material composition and thickness through which the radiation travels. In particular, the beam windows of the HT HP sample cell should be made of a material and have a thickness with a high neutron transmission. Acceptable neutron transmission of the HT HP sample cell beam windows for a neutron beam of wavelength 6 angstroms is in the range from about 50% to 99% or more, e.g., 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or more; and for a neutron beam of wavelength 8.04 angstroms is in the range from about 50% to 99% or more, e.g., 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or more. The material should also exhibit suitable density in the range from about 3.5 $g/cm^3$ to about 10 $g/cm^3$, e.g., 3.5 $g/cm^3$, 3.6 $g/cm^3$, 3.7 $g/cm^3$, 3.8 $g/cm^3$, 3.9 $g/cm^3$, 4 $g/cm^3$, 4.1 $g/cm^3$, 4.2 $g/cm^3$, 4.3 $g/cm^3$, 4.4 $g/cm^3$, 4.5 $g/cm^3$, 4.6 $g/cm^3$, 4.7 $g/cm^3$, 4.8 $g/cm^3$, 4.9 $g/cm^3$, 5 $g/cm^3$, 5.1 $g/cm^3$, 5.2 $g/cm^3$, 5.3 $g/cm^3$, 5.4 $g/cm^3$, 5.5 $g/cm^3$, 5.6 $g/cm^3$, 5.7 $g/cm^3$, 5.8 $g/cm^3$, 5.9 $g/cm^3$, 6 $g/cm^3$, 6.1 $g/cm^3$, 6.2 $g/cm^3$, 6.3 $g/cm^3$, 6.4 $g/cm^3$, 6.5 $g/cm^3$, 6.6 $g/cm^3$, 6.7 $g/cm^3$, 6.8 $g/cm^3$, 6.9 $g/cm^3$, 7 $g/cm^3$, 7.1 $g/cm^3$, $7.2 \text{ g/cm}^3$, $7.3 \text{ g/cm}^3$, $7.4 \text{ g/cm}^3$, $7.5 \text{ g/cm}^3$, $7.6 \text{ g/cm}^3$, $7.7$ g/cm$^3$, $7.8 \text{ g/cm}^3$, $7.9 \text{ g/cm}^3$, $8 \text{ g/cm}^3$, $8.1 \text{ g/cm}^3$, $8.2 \text{ g/cm}^3$, $8.3 \text{ g/cm}^3$, $8.4 \text{ g/cm}^3$, $8.5 \text{ g/cm}^3$, $8.6 \text{ g/cm}^3$, $8.7 \text{ g/cm}^3$, $8.8$ g/cm$^3$, $8.9 \text{ g/cm}^3$, $9 \text{ g/cm}^3$, $9.1 \text{ g/cm}^3$, $9.2 \text{ g/cm}^3$, $9.3 \text{ g/cm}^3$, $9.4 \text{ g/cm}^3$, $9.5 \text{ g/cm}^3$, $9.6 \text{ g/cm}^3$, $9.7 \text{ g/cm}^3$, $9.8 \text{ g/cm}^3$, $9.9$ g/cm$^3$, or $10 \text{ g/cm}^3$. In a preferred embodiment, the beam entrance window and beam exit window are integral to their corresponding sample cell members. As such, the top cell member and the bottom cell member will preferably be constructed of the material described above.

While the above parameters will enable the construction of HT HP sample cells and, in turn, the beam windows, with suitable durability and neutron transmission characteristics, it is preferable that the HT HP sample cells be reusable within a reasonably short period of time and without significant safety risk to the user. An important consideration is the radiation decay rate. For instance, when a material is exposed to radiation, radioactive nuclides are produced, which may remain activated for a long period. For instance, when a beryllium copper (CuBe$_2$) alloy is exposed to neutron radiation, radioactive nuclides Cu-64 and Cu-66 are produced. When a titanium alloy, such as TiAl$_6$V$_4$ is exposed to neutron radiation, radioactive nuclides Al-28 and V-52 are produced. As such, materials should be chosen based on a short half-life of the radioactive nuclides, or a shorter time to radioactive decay. Materials producing radioactive nuclides upon exposure to neutron radiation that takes hundreds of years to decay are not suitable for commercial use. For instance, materials selected for the HT HP sample cells, when a 100 g plate of such material is exposed to a neutron flux of $1 \times 10^8 \text{n cm}^{-2} \text{ s}^{-1}$ for 24 hours, will decay to less than $5 \times 10^{-4} \mu$Ci in less than about 5 hours; preferably less than about 4 hours; more preferably less than about 3 hours, or less than about 2.5 hours, or less than about 2 hours.

Materials having some of the above-described parameters and characteristics that are suitable for construction of the HT HP sample cell include, but are not limited to, titanium alloys (e.g., TiAl$_6$V$_4$ Grade 5, TiAl$_6$V$_4$ Grade 23 (extra low inclusion/ELI), TiAl$_6$Nb$_7$,), copper alloys (e.g., CuBe, CuBe$_2$), and aluminum alloys. In preferred embodiments, the HT HP sample cell will be made of a material possessing all of the above-described parameters, such as titanium alloy or aluminum alloy. In other embodiments, the HT HP sample cell will include an additional chemical treatment to improve the radiation transmission, chemical resistance, thermal properties, and/or mechanical properties. Suitable treatments included, but are not limited to acid washing, anodization, and/or superhydrophobic coating.

As depicted in the FIGS. 1-4, the HT HP sample cell may be constructed to have a general block shape in order to be compatible with beamline sample holders currently available at beamline centers worldwide, such as, but not limited to, the NeutroniQ 3×3 Peltier-driven temperature controlled sample holder [Quantum Northwest, Inc., Washington, U.S.A.]. However, as one having ordinary skill in the art will appreciate, the dimensions and shape of the HT HP sample cell may vary without loss of function. The HT HP sample cell described herein may comprise two portions—a top cell member and a bottom cell member that are attached together and sealed through a series of attachments members, such as torqued bolts or stainless-steel screws. In some embodiments, one or more sealing members, such as a gasket or O-ring may be incorporated to ensure good sealing qualities.

As shown in the drawings, the top cell member may have a generally rectangular shape with an outer surface that will be directed toward the incident radiation beam and an inner surface that will make contact with the bottom cell member when the HT HP sample cell is assembled and sealed. To decrease the distance the radiation beam will have to travel through the HT HP sample cell material, the top cell member may have a circular recess in the outer surface that protrudes up from the inner surface to form a raised cylinder structure. This circular recess is configured to receive the incoming radiation beam and is sometimes referred to herein as the "beam recess" or "circular beam recess". While various dimensions are contemplated, the circular beam recess will have a diameter of about 1.0 cm to about 2.5 cm. The portion of the beam recess that protrudes out from the inner surface forms a beam recess that is open at the radiation beam-receiving end and has a lateral wall at the other end that functions as the beam entrance window. While the beam entrance window can be a separate component, it is preferrable that the beam entrance window is machined into and integral to the top cell member. In some embodiments, the thickness of the beam entrance window may be from about 2 mm to 5 mm, e.g., 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, or 5 mm. It being understood however, that the thickness of the beam entrance window may be increased or decreased depending on the material selected for construction of the HT HP sample cell or the type of radiation beam used for the data collection. In one particular embodiment, the HT HP sample cell is made from titanium alloy for use in a SANS measurement sample environment and the beam entrance window has a thickness of about 2.7 mm or 3.3 mm. Further, it is preferable that the recesses be substantially a circular shape for efficient construction and because the incident radiation beams to be used with the HT HP sample cells of the invention are substantially circular.

The bottom cell member will also have a circular recess. As shown in the drawings, the inner surface of the bottom cell member contains a circular recess for receiving both the radiation beam and the sample of interest and is sometimes referred to herein as the "sample recess" or "circular sample recess". At the bottom of the sample recess is a second beam window where the sample is exposed to the incoming radiation beam and where the scattered beam exits the HT HP sample cell. While the beam exit window can be a separate component, it is preferrable that the beam exit window is machined into and integral to the bottom cell member. The beam exit window may have a thickness from about 2 mm to 5 mm, e.g., 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, or 5 mm, and may be the same thickness as the beam entrance window, or it may be a different thickness. In one particular embodiment, the beam exit window is made from a titanium alloy has a thickness of about 2.7 mm or 3.3 mm. In some embodiments, the outer surface of the bottom cell member also includes a recess on the side of the beam exit window opposite the sample to reduce the distance the radiation beam must travel through the HT HP sample cell material. Further, in preferred embodiments, the diameter of the circular sample recess is slightly greater than the diameter of the circular beam recess such that the circular beam recess is partially inserted into the circular sample recess to ensure a better seal.

When the top cell member and bottom cell member are sealed, the interior distance between the beam entrance window and the beam exit window when the HT HP sample cell is sealed is primarily a function of the amount of sample (i.e., the sample thickness) within the pressure transmitter chamber. However, in order to achieve good beam scattering signal from typical soft matter liquid samples, it is preferable that the distance between the beam entrance window and the beam exit window be between about 1 mm and about 3 mm, e.g., 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or 3.0 mm, when a soft matter liquid sample is deposited within the pressure transmitter chamber of a sealed HT HP sample cell. In one particular embodiment, the sample thickness and, thus, the distance between the beam entrance window and beam exit window is 1.25 mm.

The pressure transmitter chamber includes a compressible, but durable circular internal separator that is disposed onto the beam exit window within the sample recess. The diameter of the internal separator should be less than the diameter of the sample recess to create a space between the walls of the sample recess and the internal separator. However, to ensure optimal area exposure to the neutron beam, the inner diameter of the internal separator is preferably no less than about 10 mm. High pressures can be introduced into the system by delivery of a pressurizing fluid from, e.g., and external pressure pump. To accomplish this, the bottom cell member will have a pressure fluid port, preferably at the top end to enable compatibility with external pressure pumps available at beamline centers worldwide. The pressure fluid port will be in fluid communication with a bore or fluid passageway machined into the bottom cell member from the pressure fluid port to a small opening (also referred to here as a "pressure fluid delivery hole") in the wall of the sample recess. Preferably, this opening is positioned in close proximity to the beam exit window.

In operation, a soft matter liquid sample (e.g., containing one or more biomolecules) is deposited on the beam exit window and within the interior of the internal separator. When the top cell member is attached and sealed to the bottom cell member, e.g., via the torqued bolts or screws, the combination of the beam entrance window, the beam exit window, and the internal separator form the pressure transmitter chamber enclosing the soft matter liquid sample. When pressurizing fluid is introduced into the system, it flows into the sample recess and surrounds the other circumferential surface of the internal separator thereby applying compression force on the internal separator and, in turn, the soft matter liquid sample. Then, the radiation beam is directed into and through the beam entrance window, which then passes through the sample as the scattered radiation exits through the beam exit window to a radiation detector for data collection and analysis. In addition to the internal separator, it is preferable that a pressure distributor be included within the pressure transmitter chamber.

Figure 1:
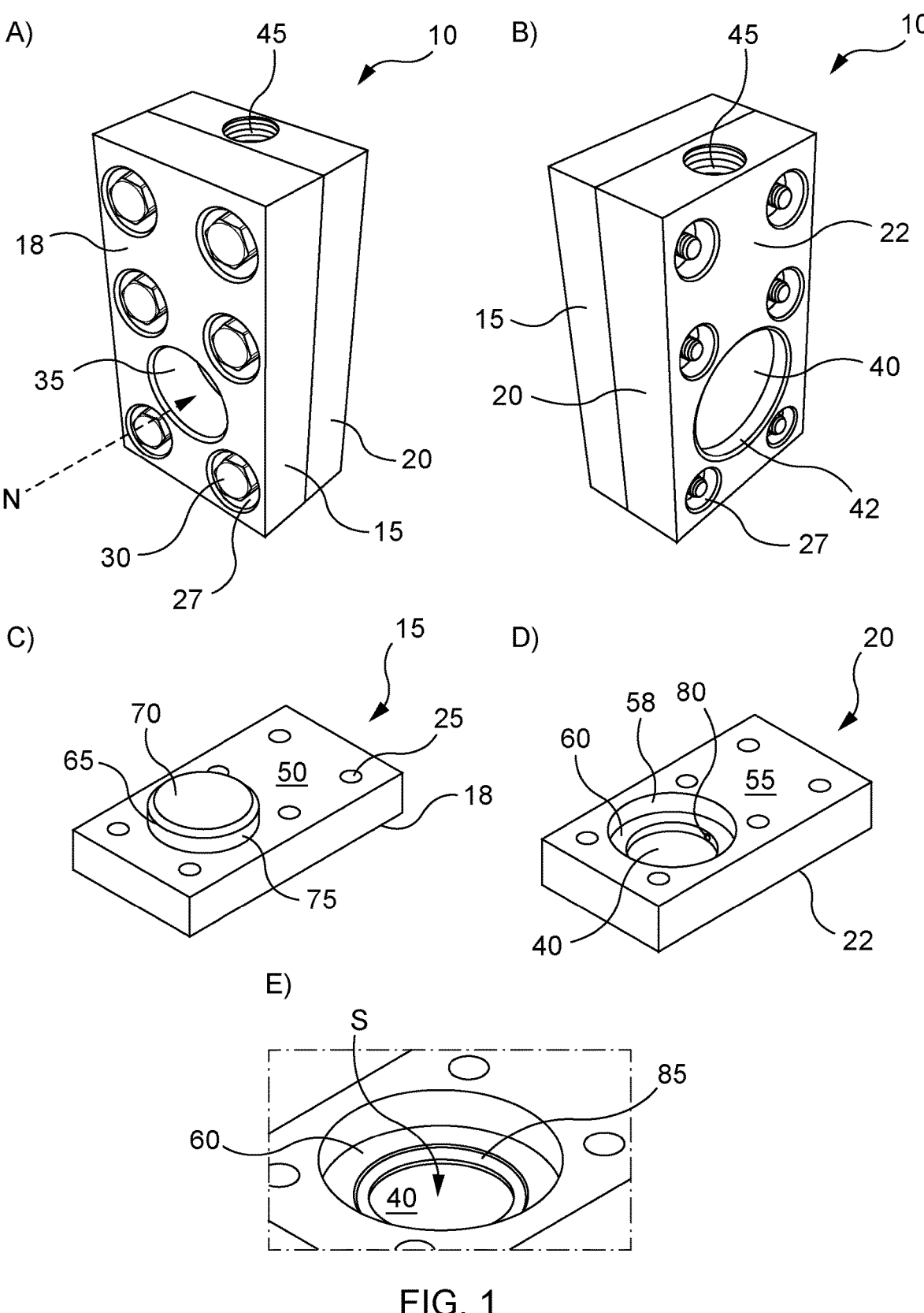
FIG. 1 depicts an exemplary HT HP sample cell without a pressure distributor. Panel A is a photograph of the front of the HT HP sample cell that receives the incoming incident radiation beam. Panel B is a photograph of the back of the HT HP sample cell that faces the radiation detector. Panel C is a diagram of the top cell member, and panel D is a diagram of the bottom cell member. Panel E is an enlarged view of the bottom cell member showing the circular internal separator.
Figure 2:
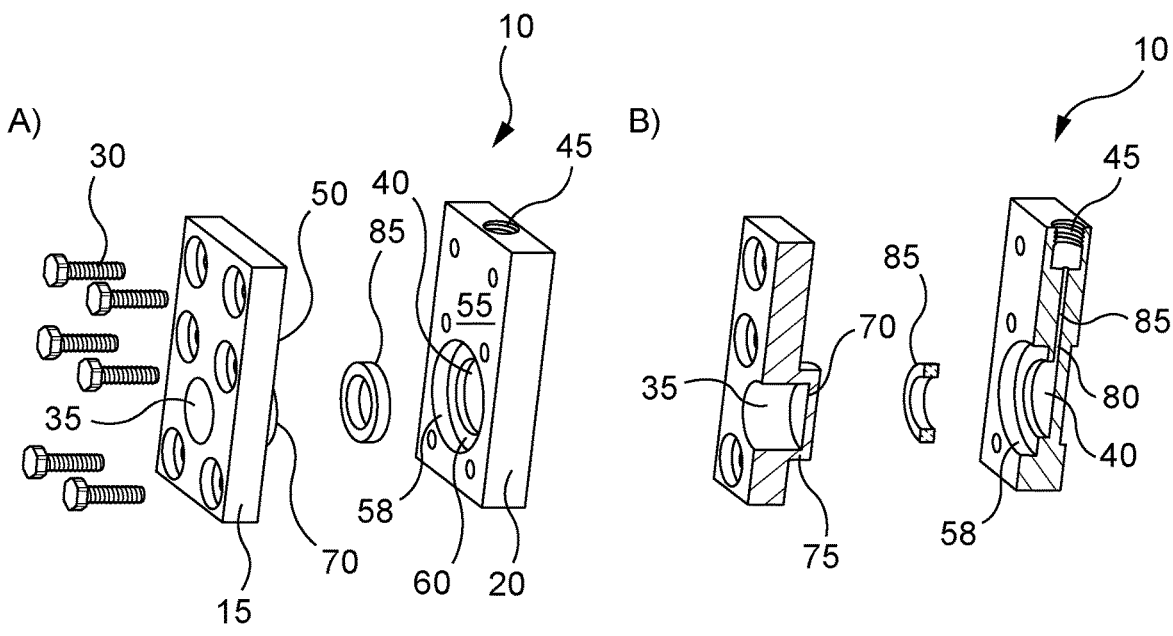
FIG. 2 are diagrams showing front perspective views of the exemplary HT HP sample cell of FIG. 1. Panel A is an exploded diagram showing the top cell member and the bottom cell member. Panel B is a cross sectional diagram showing the top cell member and the bottom cell member.
Figure 3:
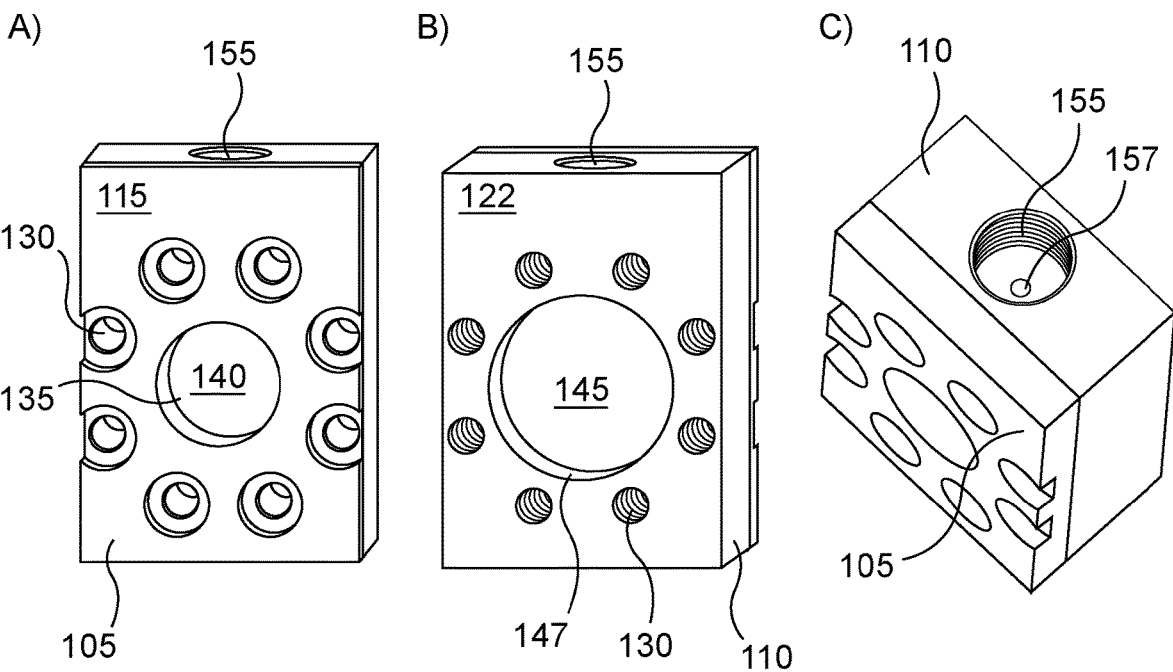
FIG. 3 depicts an exemplary preferred embodiment of a HT HP sample cell with a pressure distributor. Panel A is a front view of the exemplary HT HP sample cell. Panel B is a back view of the exemplary HT HP sample cell. Panel C is the top perspective view of the exemplary HT HP sample cell. Panel D is front perspective view of the unassembled top cell member and bottom cell member. Panel E is an enlarged view of the circular sample recess (the internal separator and pressure distributor are omitted for simplicity). Panel F is an enlarged view of the circular sample recess showing the internal separator and the pressure distributor.
Figure 3:
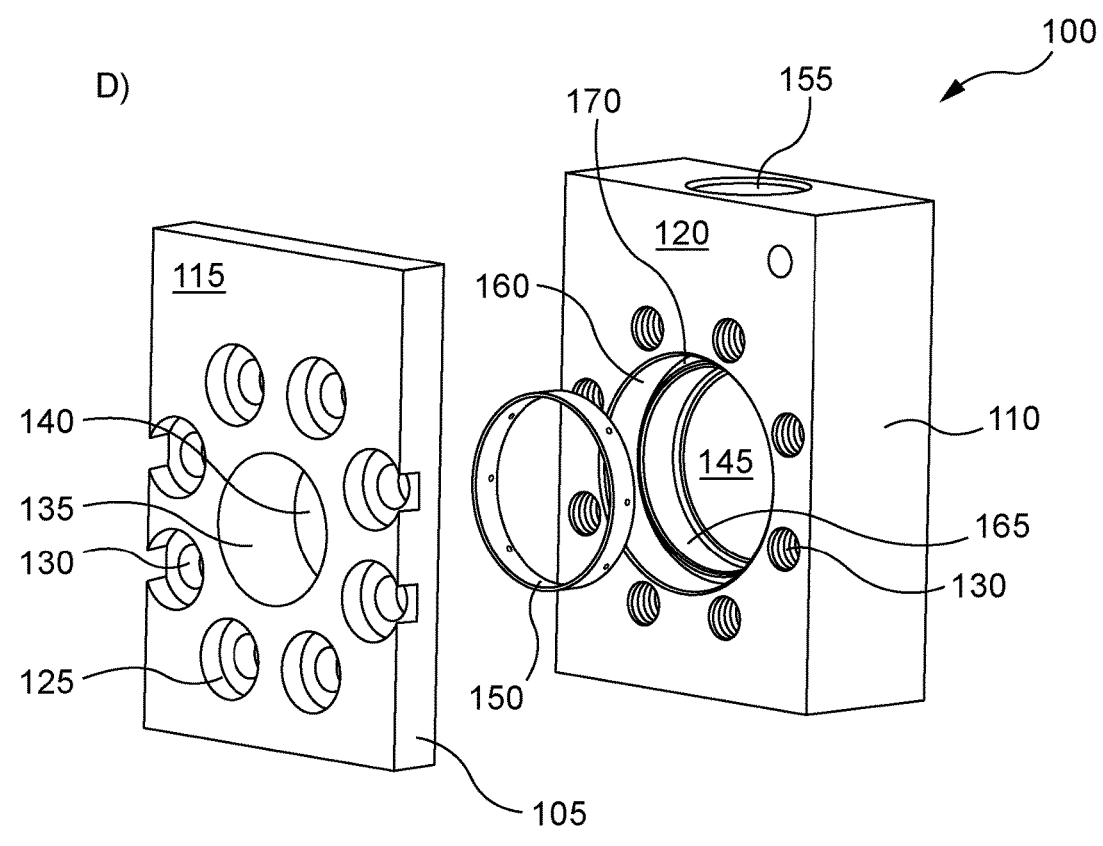
Figure 3:
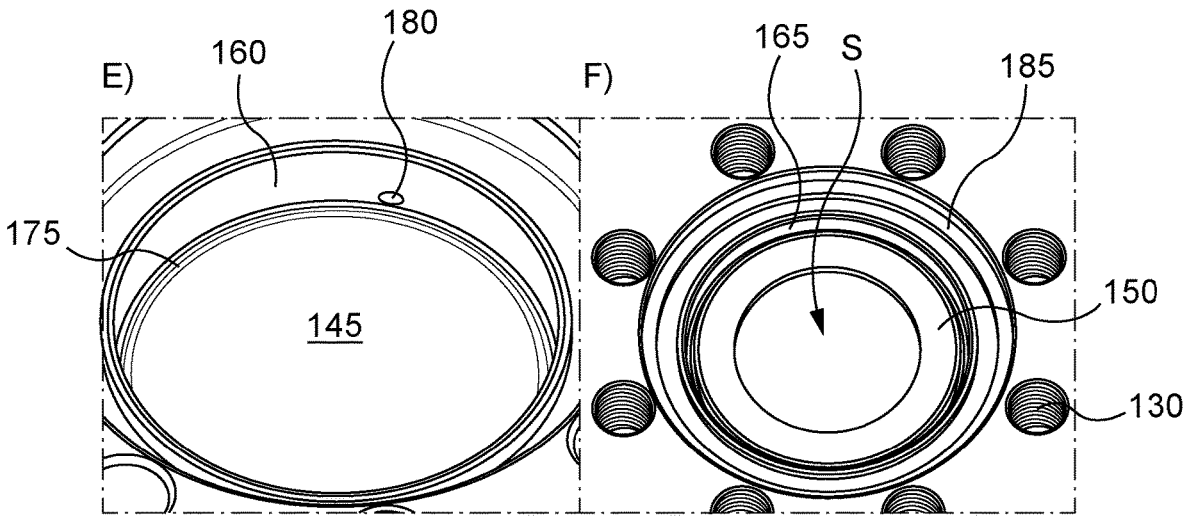
Figure 3:
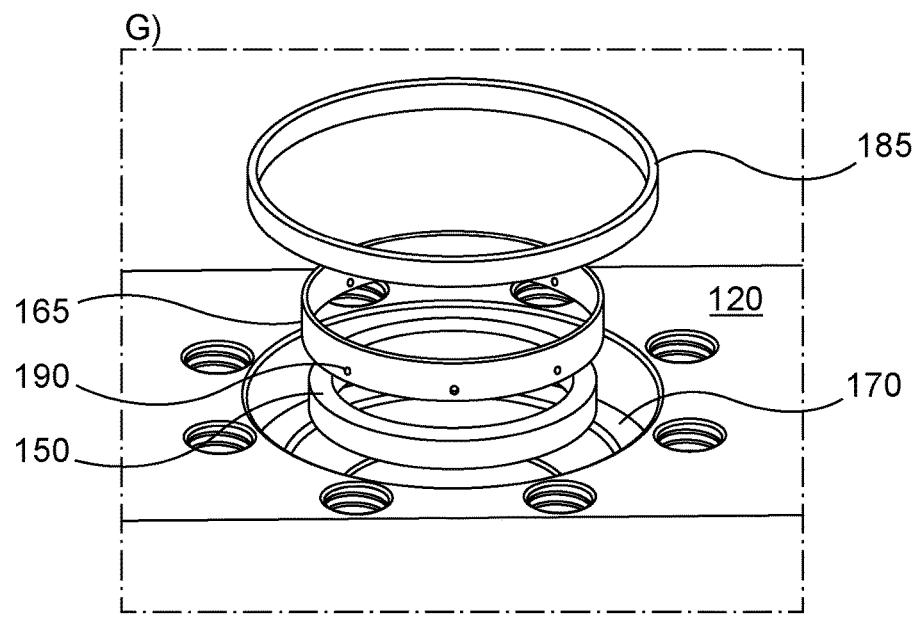

As pressurizing fluid is delivered to the outer circumferential surface of the internal separator, the initial focal point of contact may create an uneven pressure distribution across the internal separator, thereby increasing the likelihood of damage or otherwise causing the internal separator to fail. Thus, to better ensure even distribution of the cross-sectional compression on the system, the pressure distributer is used to evenly distribute the surface-contact area between the pressurizing fluid and the internal separator. The pressure distributer may have a circular shape with a diameter that is slightly less than the diameter of the circular sample recess, but greater than the outer diameter of the internal separator. In these embodiments, the pressure distributer is disposed within the circular sample recess within a groove that is machined into the beam exit window forming the bottom of the circular sample recess. A plurality of holes are bored through the walls of the pressure distributor and positioned circumferentially around the walls of the pressure distributer (see FIG. 3G). The compressible, circular internal separator is disposed within the pressure distributer so that the sample recess, pressure distributor, and internal separator form a concentric arrangement. In some embodiments, the compressible, circular internal separator will have an outer diameter that is about 1% to about 5%, e.g., 1%, 2%, 3%, 4%, or 5%, less than the inner diameter of the pressure distributor. In this embodiment, as pressurizing fluid enters the pressure fluid port, it will enter the pressure transmitter chamber through the pressure fluid delivery hole. Then, the pressurizing fluid circulates around the outer circumference of the pressure distributer and through the plurality of holes, thereby making contact with and compressing the internal separator and soft matter liquid sample within. As one having ordinary skill in the art will appreciate, this process is akin to squeezing a balloon. A preferred example of this embodiment, is depicted in FIG. 3.

Since high pressures may be used from time to time for data collection, the internal separator should have suitable elastic deformation characteristics to apply stress to the sample within in response to pressurizing fluid at its outer circumferential surface. In preferred embodiments, the internal separator will be made from a material capable of between about 10% to 30%, e.g., 10%, 11%, 12%, 13%, 14%, 15%, 16%, 17%, 18%, 19%, 20%, 21%, 22%, 23%, 24%, 25%, 26%, 27%, 28%, 29%, or 30% cross-sectional diameter compression; preferably, between about 11% and 26% cross-sectional diameter compression; more preferably, between about 11.31% and 25.10% cross-sectional diameter compression. Suitable materials for the internal separator include, but are not limited to O-rings made from hydrogenated elastomers, partially-fluorinated elastomers (i.e., fluoroelastomers), silicone, nitrile elastomers, and the like. The internal separators may have a thickness in the range from about 0.2 cm to about 0.5 cm, e.g., 0.2 cm, 0.3 cm, 0.4 cm, 0.5 cm. Preferably, the thickness of the internal separator is from about 0.2 cm to about 0.4 cm; more preferably, from about 0.2 cm to about 0.35 cm. The internal separator may have any cross sectional profile (i.e., shape), including, but not limited to square, circle, X-profile, or double X-profile.

The internal separator materials may be chosen that are at least partially "transparent" (i.e., will not significantly scatter or deflect) to the radiation beam particles being used in the analysis. For instance, when neutron radiation is used as the radiation source (e.g., SANS environment), fluoroelastomer materials high in fluorine content can be used for the internal separator as these materials reflect only a small amount of the neutron particles. In some embodiments, fluoroelastomers are used having a fluorine content of between about 50% and about 80%, e.g., 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%; preferably, between about 60% and 75% fluorine. In another embodiment, the fluorine content of the fluoroelastomer is at least about 50%, or at least about 60%, or at least about 70%, or at least about 80%. In one particular embodiment, the elastic deformation barrier is made from a fluoroelastomer containing a terpolymer of vinylidene fluoride, hexafluoropropylene, and tetrafluoroethylene is used, e.g., VITON fluoroelastomer (The Chemours Company, Wilmington, Delaware, USA). In some embodiments, the elastomeric material is not a fluoroelastomer, but nonetheless has a low hydrogen content of less than 20% hydrogen, e.g., 20%, 19%, 18%, 17%, 16%, 15%, 14%, 13%, 12%, 11%, 10%, 9%, 8%, 7%, 6%, 5%, or less, such as, but not limited to nitrile butadiene rubber (i.e., Buna-N). However, as one having ordinary skill in the art will appreciate, some small amount of neutron radiation scattering can still occur with such materials. Notwithstanding, the internal separator preferably will have a minimum internal diameter of at least about 10 mm to avoid the direct beamline path.

Moreover, and to withstand the extreme temperatures and pressures used to measure the sensitivity of the samples of interest, the internal separator should be sufficiently durable to stress and temperature. In preferred embodiments, the internal separator is made from a elastomeric material having a shore A durometer value of at least about 60, e.g., 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95 or more. More preferably, the internal separator material will have a shore A durometer value of at least about 70, or at least about 90. The internal separator material should have sufficient tensile strength enabling it to protect the sample and resist extrusion, splitting, or irreversible deformation in response to high pressures (e.g., up to 220 MPa) and at extreme temperatures (e.g., −21° C.). In particular, the internal separator will have a tensile strength and maximum elongation value (i.e., the maximum deformation permitted without irreversible damage done to the material) such that the elongation of the internal separator does not exceed its maximum elongation value when exposed to pressure of at least about 80 MPa; preferably, it will not exceed its maximum elongation value when exposed to pressure of at least about 100 MPa; more preferably, it will not exceed its maximum elongation value when exposed to pressure of at least about 150 MPa, or at least about 200 MPa, or at least about 210 MPa, or at least about 220 MPa. The elongation at break relationship can be determined by the following formula:

$$\in = \frac{\partial}{E} < \text{Max Elongation of Material} \qquad \text{Equation 1}$$

Where the value of $\partial$ is the pressure exhibited on the system, E is the Young's modulus of the material, and $\in$ is the elongation at break.

In some embodiments, the internal separator material will have a tensile strength of at least about 10 MPa, e.g., 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, 165 MPa, 170 MPa, 175 MPa, 180 MPa, 185 MPa, 190 MPa, 195 MPa, 200 MPa, 205 MPa, or 210 MPa and/or a maximum elongation of at least about 250%, e.g., 250%, 300%, 350%, 400%, 450%, 500%, 550%, 600%, 650%, 700%, 750%, 800%, 850%, 900%, 950%, 1,000%, or higher such that the elongation at break does not exceed the maximum elongation of the material when exposed to pressure greater than about 80 MPa; preferably, the elongation at break does not exceed the maximum elongation of the material when exposed to pressure greater than about 100 MPa, or greater than about 150 MPa, or greater than about 200 MPa, or greater than about 210 MPa, or greater than about 220 MPa. In a particular embodiment, pressurizing fluid is delivered into the HT HP sample cell to exert a pressure on the pressure transmitter chamber that is between about 200 MPa and about 220 MPa without causing irreversible deformation, splitting, unseating, or extrusion of the internal separator; leakage of the sample out of the pressure transmitter chamber; or cross contamination of the sample and the pressurized fluid. In another particular embodiment, the HT HP sample cell is simultaneously exposed to pressure between about 200 MPa and about 220 MPa and a temperature range between about −21° C. and about 0° C. without irreversible deformation, splitting, unseating, or extrusion of the internal separator; leakage of the sample out of the pressure transmitter chamber; or cross contamination of the sample and the pressurized fluid.

In some embodiments, the internal separator is an O-ring or gasket made from silicone, nitrile butadiene rubber (i.e., Buna-N), or a fluoroelastomer. In some embodiments, the fluoroelastomer includes a combination of vinylidene fluoride, hexafluoropropylene, and tetrafluoroethylene (e.g., VITON B, VITON GF-200S, VITON F, or VITON AL fluoroelastomers). In each case, the internal separator will have the combination of thickness, profile, tensile strength, and maximum elongation necessary to tolerate the extreme temperature and pressure conditions discussed above. In one particular embodiment, the internal separator is an O-ring made with a square profile composed of VITON GF-200S fluoroelastomer [The Chemours Company, Wilmington, Delaware, U.S.A.], which reduces incoherent scattering of neutrons compared with standard fluoroelastomer O-rings.

As discussed herein, it may be desirable to design the HT HP sample cell with dimensions that are compatible with cell holders (also sometimes referred to as cell or sample changers) currently available at existing beamline centers, such as, but not limited to the NeutroniQ 3×3 Peltier Driven Sample Changer [Quantum Northwest, Inc., Washington, U.S.A.], the 9P or 9CB 9-position sample holder maintained by the NIST Center for Neutron Research [Gaithersburg, Maryland, U.S.A.], and the like. Therefore, the dimensions of the assembled HT HP sample cell may have a front surface with a width of about 3 cm to about 4 cm, and a height of about 4.5 to about 5 cm. From front to back, the HT HP sample cell may be from about 2 cm to about 2.5 cm. Therefore, the HT HP sample cell can be inserted into the cell sample holder and attached to the appropriate temperature controls and pressure pump system in the beamline environment. As will be explained further below, these sample changes enable the use of up to nine HT HP sample cells for high-throughput analysis of the sample of interest exposed to various temperatures and pressures.

FIGS. 1A-1E depict an exemplary HT HP sample cell 10 that includes a top cell member 15 and a bottom cell member 20 in an assembled configuration. This particular embodiment does not include a pressure distributor. As will be shown in greater detail below, the soft matter liquid sample of interest is deposited within the internal separator of the pressure transmitter chamber, which is positioned within the HT HP sample cell 10 and between the between the beam entrance window 70 and beam exit window 40. The pressurizing fluid can be delivered to the pressure transmitter chamber via the pressure fluid port 45.

As shown in FIGS. 1A and 1B, the top cell member 15 and bottom cell member 20 are held together by a series of bolts 35 threaded through bolt holes 25 that are machined into the recesses 27 in the outer surface 18 of the top cell member 15 and the outer surface 22 of the bottom cell member 20. The outer surface 18 of the top cell member 15 further includes a bore or circular beam recess 35, leading to the beam entrance window 70 (see FIG. 1C). On the outer surface 22 of the bottom cell member 20 is a beam exit window 40 disposed within a beam exit window recess 42. Therefore, when the HT HP sample cell 10 is assembled and placed into a sample holder of a sampling environment, e.g., a Peltier-driven SANS sample holder, a beam of radiation, such as a neutron beam N, can pass through the beam entrance window 70 and through the sample, with the scattered neutrons existing the beam exit window 40.

FIGS. 1C-1E better illustrate the interior of the HT HP sample cell 10. On the top cell member 15, the circular beam recess protrudes perpendicularly from the inner surface 50 of the top cell member 15 and forms a circular beam recess wall 75. At the end of the circular beam recess wall opposite the inner surface 50 is the beam entrance window 70 (see FIG. 1C). In preferred embodiments, the beam entrance window 70 and circular beam recess wall 75 are integral to the top cell member 15 and machined from a single piece of material, thereby increasing resistance to fluid and/or sample leakage even when exposed to very low temperatures or high pressures. In this particular embodiment, there is a circular groove 65 between the beam entrance window 70 and the circular beam recess wall 75 to enable precise positioning with the bottom cell member 20 to form a better seal when the HT HP sample cell 10 is assembled.

The inner surface 55 of the bottom cell member 20 includes a sample recess 58 that includes a circular shoulder 60 and the beam exit window 40. As shown in FIG. 1D, the circular shoulder 60 is slightly raised above the beam exit window 40. In preferred embodiments, the sample recess 58, circular shoulder 60, and beam exit window 40 are integral to the bottom cell member 20 and machined from a single piece of material, thereby increasing resistance to fluid and/or sample leakage even when exposed to very low temperatures or high pressures. Moreover, the circumference and diameter of the sample recess is greater than the circumference and diameter of the circular beam recess wall 75 to enable insertion of the circular beam recess wall 75 into the sample recess 58 until the circular groove 65 contacts the circular shoulder 60 within the sample recess 58.

Also shown in FIG. 1D is a pressure fluid delivery hole 80 that is bored into the inner wall of the circular shoulder 60 and in fluid communication with the pressure fluid port 45. When pressurizing fluid is delivered to the HT HP sample cell 10, the pressurizing fluid exits the pressure fluid delivery hole 80. For clarity, the internal separator has been omitted from FIG. 1D. FIG. 1E is an enlarged view of the sample recess 58. An internal separator 85, which can be a compressible O-ring, is disposed within the circumference of the circular shoulder 60 and against the beam exit window 40. The sample S is placed within the internal separator 85. Therefore, when the HT HP sample cell 10 is assembled, pressurizing fluid can be delivered through the pressure fluid port 45, which then exits the pressure fluid delivery hole 80 and surrounds the outer circumference of the internal separator 85 to compress the internal separator 85 and, therefore, apply pressure to the sample. In this manner, a radiation beam, such as a neutron beam, can be directed through the beam entrance window 70 and sample and out the exit beam window 40. An appropriate detector can be used to measure the effect on the exiting radiation beam. For example, neutron scattering can be measured to provide information on the sample response to fluid pressure. In addition, the temperature of the sample can be regulated to measure the sample's response to different temperatures in much the same manner.

FIGS. 2A and 2B provide additional views of the HT HP sample cell 10. The internal separator 85 is disposed onto the beam exit window 40 and inside the circular shoulder 60. The inner surface 50 of top cell member 15 is placed against the inner surface 55 of the bottom cell member 20 so that the beam entrance window 70 and beam recess wall 75 are inserted into the sample recess 58 to seal the pressure transmitter chamber. The bolts 30 are threaded into the bolt holes to secure the top cell member 15 to the bottom cell member 20. FIG. 2B is a cross section to better illustrate the beam recess 35 and sample recess 58. As depicted in this embodiment, the beam recess 35, beam recess wall 75, and beam entrance window 70 form a cylinder shape that protrudes from the inner surface 50 of the top cell member 15. Further, in this depiction, a pressure fluid passageway 85 can be seen that connects the pressure fluid port 45 and the pressure fluid delivery hole 80 to enable the delivery of pressurized fluid into the pressure transmitter chamber.

FIGS. 3A-3G shows a preferred embodiment of an HT HP sample cell that contains a pressure distributor. As illustrated in FIGS. 3A-3C, the HT HP sample cell 100 includes a top cell member 105 and a bottom cell member 110 that are secured together by threading a series of bolts (not shown) through the bolt holes 130. There is a circular beam recess 135 in the top surface 115 of the top cell member 105, which is oriented perpendicularly to the outer surface 115 and protrudes out from the inner surface (not visible) of the top cell member 105, terminating in a beam entrance window 140. In this embodiment, the beam entrance window 140 is integral to and machined into the top cell member 105. On the outer surface 122 of the bottom cell member 110, there is a circular recess 147 and beam exit window 145. In this embodiment, the beam exit window 145 is integral to and machined into the bottom cell member 110. In operation, the incident radiation beam, such as a neutron beam, enters the beam entrance window 140 on the outer surface 115 of the top cell member 105, is scattered by the soft matter liquid sample within the pressure transmitter chamber (not visible), and exits the beam exit window 145 of the bottom cell member 110. Also shown is the pressure fluid port 155 and top portion of the pressure fluid passageway 157 for delivering pressurizing fluid to the HT HP sample cell 100.

FIG. D better illustrates the interior components of the HT HP sample cell 100. The bolt holes 130 are machined into recesses 125 in the outer surface 115 of the top cell member 105. In this embodiment, the bolt holes 130 are arranged circumferentially around the circular beam recess 135 in the outer surface 115 of the top cell member 105. As noted above, torqued bolts or stainless steel screws are used to hold the top cell member 105 and bottom cell member 110 together. The beam entrance window 140 is also visible. The bottom cell member 110 includes a sample recess 160 that is oriented perpendicularly to the inner surface 120, the bottom of which forms the beam exit window 145. In this embodiment, a circular pressure distributor 165 is disposed within the sample recess 160. The internal separator 150 is disposed within the interior of the pressure distributor 165 in a concentric arrangement. When pressurizing fluid is delivered into the pressure fluid port 155, it exits the pressure fluid delivery hole (not shown), circulates around the pressure distributor 165, passes through a series of distributor holes 190 (see FIG. 3G) in the pressure distributor 165, and applies the pressure to the outer circumferential surface of the internal separator 150.

FIGS. 3E and 3F are enlarged diagrams showing the components of the pressure transmitter chamber of the HT HP sample cell 100. The circular pressure distributor 165 is positioned within the sample recess 160 and within a groove 175 between the pressure fluid delivery hole 180 and the internal separator 150. In other words, the internal separator 150 is disposed within the circular pressure distributor 165 in a concentric configuration and against the beam exit window 145. The sample S of interest is placed within the internal separator 150, and the top cell member 105 is attached to the bottom cell member 110. Pressurizing fluid can be delivered to the pressure fluid port 155 (see FIG. 3C), through the pressure fluid passageway 157 (see FIG. 3C), and out the pressure fluid delivery hole 180. The pressurizing fluid is evenly distributed around the circumferential surface of the internal separator 150 via the pressure distributor 165. A separate groove 170 (see FIG. 3D) may be included for receiving an O-ring or other sealing member 185 to enable a tighter seal with the HT HP sample cell 100 is assembled.

FIG. 3G depicts an exploded view better illustrating the pressure distributor 165. The pressure distributor 165 includes a plurality of distributor holes 190 circumferentially positioned around the circular wall of the pressure distributor 165. In operation, a pressurizing fluid is delivered into the pressure fluid port 155, through the pressure fluid passageway 157 (see FIG. 3C) and out the pressure fluid delivery hole 180 (see FIG. 3E). The pressurizing fluid is forced around the pressure distributor 165 as it passes through the plurality of distributor holes 190 to apply compression force to the outer circumference of the internal separator 150, which, in turn compresses the sample S. In this manner, the even distribution of pressurizing fluid around the internal separator 150 decreases the likelihood of failure of the internal separator 150 due to uneven pressure against one area.

While the HT HP sample cell design described herein is sufficient to withstand high pressures that may be used for measuring sample response, the pressure fluid port may need adaptors to establish an appropriate seal with standard pressure systems used at beamline centers. Thus, for increased stability and ease of use, additional embodiments of the HT HP sample cell design may be configured to connect to any available pressure system without the need for adapters. As such, another embodiment of the HT HP sample cell includes a pressure fluid port with a threaded male connector member as shown in FIG. 4. The benefits of this design include, but are not limited to, there would be no need to use adapters to connect the sample cell to the pressure pump system, which reduces the probability of leaks, and the male connector member allows for a larger connection, which is preferred for higher pressures.

FIGS. 4A and 4B depict an embodiment of a HT HP sample cell with a threaded male connector member. In these embodiments, the separator member and pressure distributor are omitted for simplicity. The HT HP sample cell 200 includes a top cell member 205 and a bottom cell member 210. The inner surface 215 of the top cell member 205 is shown, which includes the beam entrance window 235 and bolt holes 225. Also shown is the inner surface 220 of the bottom cell member 210. In this embodiment, the pressure fluid port 250 contains a threaded male connector member 230 for enabling connection to pressure pump systems without the need for adapters and for enabling the use of higher pressures. In this particular embodiment, the inner surface 220 contains a sample recess 245 and beam exit window 240. As pressurized fluid is delivered into the pressure fluid port 250, it exits the pressure fluid delivery hole 255 to contact the outer circumferential surface of the internal separator (not shown) of the pressure transmitter chamber.

Sampling Environment

The HT HP sample cell described herein can be used in a high-pressure fluid system and beamline sampling environment, such as a HT HP SANS sampling environment, that allows for radiation scattering measurements to provide information about a soft matter liquid sample's sensitivities to pressure and temperature changes. The design of the HT HP sample cell enables high-throughput analysis as soft matter liquid samples can be loaded into multiple HT HP sample cells suitable for withstanding extreme pressures and temperatures, which are inserted into the sample holders available at beamline centers. External temperature sources can be used to equilibrate the temperature of the HT HP sample cell and the sample within, while pressurizing fluid can be delivered to the HT HP sample cell from an external pressure pump into the pressure fluid port for high pressure analysis.

As noted above, the HT HP sample cells of the invention are designed for holding pressure and transmitting such pressure to the enclosed sample, without allowing crossover contamination between sample and pressurizing fluid (water), while neutron, or other, radiation is used to probe the sample. In a particular embodiment, the HT HP sample cells of the invention are used in a HT HP SANS sampling environment at a beamline center. At the beginning of the SANS experiment, the user will first load the soft matter liquid sample of interest, e.g. biomolecules in solution, into the sample recess of the bottom cell member. More specifically, the sample is manually loaded within the inner wall of the internal separator using art-standard means, such as with a pipettor. The internal separator is made from a suitable material, such as, but not limited to, a fluoroelastomer O-ring, which has an inner internal diameter of no smaller than 10 mm for optimal area exposure to the incident neutron beam. As shown above (for example, FIG. 3), the internal separator is centered inside a pressure distributor ring, which itself is held into place by a circular groove machined into the bottom of the sample recess on the beam exit window. As pressurizing fluid is delivered into the pressure transmitter chamber, the pressure is transmitted to the internal separator by the pressure disturber through equally spaced distributor holes drilled around its circumference. The internal separator isolates the sample from the pressurizing fluid. A second sealing member, such as a VITON O-ring, sits in the channel above the pressure transmitter chamber as shown in FIG. 3 and acts as a seal for holding the pressurizing fluid within the HT HP sample cell.

After sample loading is completed, the top cell member is aligned with the bottom cell member and metal-to-metal sealing is achieved when the 8 threaded bolts are torqued to a load of 3.74 N*m, mating the two halves. The closing of the two cell halves compresses both the sealing O-ring and the internal separator vertically, creating a seal. Pressurizing fluid is introduced through the pressure fluid port, moves into the pressure transmitter chamber through the pressure fluid delivery hole (see, e.g., FIG. 3E), and surrounds the pressure distributor ring to transmit pressure to the internal separator and, thus, the soft matter liquid sample held within. In a particular embodiment, the sealing O-ring and the internal separator are both cut O-rings composed of 90 durometer Viton (FKM). The internal separator can also be made of Viton GF-200S, a compound formulated by The Chemours Company which reduces incoherent scattering of neutrons when compared with standard Viton (FKM).

FIG. 5 depicts an exemplary pressurizing system for use in a SANS environment. In this embodiment, the pressurizing system 300 includes a cell sample holder (not shown) capable of holding up to 9 HT HP sample cells 100. The pressurizing system 300 is used to pressurize a single HT HP sample cell 100 or up to nine HT HP sample cells 100. The pressurizing system 300 generally includes a pressure pump 305 and pressure piston 310 that is connected to a manifold 335 by high pressure tubing 312. The HT HP sample cells 100 connect individually to the pressurizing system 300 by means of high pressure metal fittings and tubing 312. The HT HP sample cells 100 are grouped into three's and each group has an automated valve 315 used to open or close flow of pressurizing fluid to the cells from the pressure source. The automated valves 315 are controlled by LabVIEW software compatible with existing controls and software at the national laboratories. The source of pressurizing fluid is a manual or automated pressure pump 305, which when operated pushes fluid through the high pressure tubing 312 to the manifold 335, which then diverts the pressurizing fluid through open ports. The manifold 335 has up to 10 ports that can be used, and any ports not being utilized are plugged with a standard high pressure plug. The pressurizing fluid path moves from pressure pump 305 to the manifold 335, to the automated valves 315, and ultimately to the one or more HT HP sample cells 100. For safety purposes, high pressure rupture discs (not shown) designed to burst when a set pressure is felt, are placed in series with each block of three cells. The safety rupture disc will release the pressure in the system before it reaches a level that would damage equipment or risk safety of the user, the safety pressure for this system was determined to be 288 MPa. In every pressure system a pressure relief measure must be implemented in the case that any part of the system fails and/or an error causes over pressurization to occur. In this system a rupture disc is used, other safety mechanisms include metal seat fluid relief valves and manual relief valves. Safety mechanisms are commonly known to those familiar with the art of high pressure.

The temperature of each HT HP sample cell 100 is controlled by means of a Peltier driven sample holder (not shown), such as, but not limited to, the Quantum Northwest NeutroniQ 3×3 available at national labs including NIST and Oak Ridge National Laboratory. The sample holder can adjust temperature of cells in groupings of three, thus different temperatures may be set for each group of three cells at any given time. There is established automation technology at the national labs for moving each sample window of the nine in the sample holder into and out of the beamline, allowing for multiple measurements to be taken within the process of a single set up. Software is already established at national beamlines for controlling temperature and movement of the samples in front of the neutron beamline, and this system would include software for controlling the automated valves that is ultimately compatible with the existing programs to allow for an integrated control program.

The manifold 335 shown allows for three soft matter liquid samples to be pressurized simultaneously, while only one soft matter liquid sample is exposed to neutrons at any given time, enabling fast screening of HP-SANS at various temperatures for a single pressure. Different combinations of pressure and temperature pre-equilibration (prior to exposure to neutrons) are possible, depending on the number of valves chosen and the number of independent sample slots available on the sample changer (beamlines often have different options). After loading samples into the nine cells, the user would connect each cell to the provided high pressure tubing. The cells would then be placed into the above-mentioned sample holder for temperature control and for ease of movement into and out of the neutron beamline. One group of cells would be set to pressurize, once pressure is reached, they would be moved to meet the neutron beamline individually. While measurements are being taken on a single sample, other groups within the set could be pressurized. This would give the user less downtime waiting on pressurization before moving onto the next set of samples.

Exposure of the HT-HP-SANS cell to neutrons results in activation of the materials. The time required for decay of the materials to a level that is compatible with reusing the individual cells and high-throughput measurements was a design constraint. Materials with shorter half-life, such as Titanium grade 5, was found to be a good compromise between a material with sufficient ultimate tensile strength, machinability, neutron scattering properties, and relatively short decay times after activation. The cells can remain in the sample changer while other samples are being measured, decaying before there is a need for manual removal and radiation control procedures. Existing HP-SANS apparatus are significantly more limited by this constraint, given the larger volume of exposed materials and the lack of automation for temperature-controlled sample changing.

FIG. 6 is a diagrammatical representation of an exemplary SANS environment 400. SANS is a technique that is well within the purview of the skilled artisan and will only be described generally herein. Briefly, the sample environment 405, which includes an HT HP sample cell is placed into a cell changer/holder 410 at a distance and position suitable for receiving a beam of radiation for SANS imaging. A horizontal cold source 415 and a velocity selector 420 produce a neutron beam N that passes through a collimation system 425. As the beam passes through the diaphragm 430 it is focused on the sample 405 by the aperture 440. The neutron beam N is scattered as it passes through the sample and is imaged I on a detector 450 disposed within an evacuated tube 445.

In preferred embodiments, the neutron beam is created by accelerating hydrogen isotopes, e.g., deuterium, tritium, or a mixture of deuterium and tritium. In one particular embodiment, the neutron beamline is produced by a neutron velocity selector with a rotation speed of between about 2,800 rpm and about 28,300 rpm and a tilt angle of about −10 degrees to about 10 degrees. Finally, the scattering of the neutron radiation can be detected using any art-standard means, such as an 3He multidetector.

REFERENCE NUMBERS

10—HT HP Sample Cell
15—top cell member
18—outer surface (top cell member)
20—bottom cell member
22—outer surface (bottom cell member)
25—holes for threaded bolts
27—recess for bolt holes
30—bolts (threaded)
35—beam recess
40—beam exit window
42—beam exit window recess
45—pressure fluid port
50—inner surface (top cell member)

55—inner surface (bottom cell member)
58—sample recess
60—circular shoulder
65—groove
70—beam entrance window
75—beam recess wall
80—pressure fluid delivery hole
85—internal separator (O-ring)
85—pressure fluid passageway
N—neutron beam
100—HT HP Sample Cell with pressure distributor
105—top cell member
110—bottom cell member
115—outer surface (top cell member)
120—inner surface (bottom cell member)
122—outer surface (bottom cell member)
125—recess for bolt holes
130—holes for threaded bolts
135—beam recess
140—beam entrance window
145—beam exit window
147—exit beam recess
150—internal separator (O—ring)
155—pressure fluid port
157—pressure fluid passageway
160—sample recess
165—pressure distributor
170—groove
175—pressure distributor groove
180—pressure fluid delivery hole
185—sealing member
190—fluid distributor holes
200—HT HP Sample Cell with threaded connector
205—top cell member
210—bottom cell member
215—inner surface (top cell member)
220—inner surface (bottom cell member)
225—bolt holes
230—male connector
235—beam entrance window
240—beam exit window
245—sample recess
250—pressure fluid port
255—pressure fluid delivery hole
300—P/T control system
305—pressure pump
310—pump piston
312—high pressure tubing
315—2-way pressure valves
335—manifold
400—SANS environment
405—sample
410—sample changer/block
415—horizontal cold source
420—velocity selector
425—collimation system
430—diaphragm
440—aperture
445—evacuated tube
450—detector

We claim:

1. A high-throughput, high-pressure (HT HP) sample cell for connection to a pressure system for measuring radiation scattering of a soft matter liquid sample under pressure, the sample cell comprising:

(a) a pressure transmitter chamber comprising a compressible, circular internal separator member;

(b) an enclosure comprising:

(i) a top cell member comprising a first outer surface, a first inner surface, and a circular beam recess in the first outer surface and oriented perpendicularly to the first outer surface and first inner surface, wherein the circular beam recess comprises a beam entrance window;

(ii) a bottom cell member comprising a second outer surface, a second inner surface, a circular sample recess in the second inner surface and oriented perpendicularly to the second outer surface and second inner surface, and a pressure fluid delivery hole, wherein the circular sample recess comprises a beam exit window;

(iii) a pressure fluid inlet port for connecting the sample cell to a supply of pressurizing fluid and in fluid communication with the pressure fluid delivery hole for delivering the supply of pressurizing fluid to the circular sample recess; and wherein the compressible, circular internal separator member is disposed within the circular sample recess and makes contact with the beam exit window, wherein the compressible, circular internal separator member is configured for receiving a soft matter liquid sample and for applying compression to the soft matter liquid sample when pressurized fluid is delivered to the circular sample recess.

2. The HT HP sample cell of claim 1, wherein the beam entrance window is integral to the top cell member, the beam exit window is integral to the bottom cell member, or both the beam entrance window is integral to the top cell member and the beam exit window is integral to the bottom cell member.

3. The HT HP sample cell of claim 1, wherein the pressure transmitter chamber further comprises a circular pressure distributor comprising a plurality of holes for flowing pressurizing fluid, wherein the circular pressure distributor is disposed within the circular sample recess and between the compressible, circular internal separator member and the pressure fluid delivery hole.

4. The HT HP sample cell of claim 3, wherein:

(i) an outer diameter of the compressible, circular internal separator is less than an inner diameter of the circular pressure distributor; or (ii) a diameter of the circular beam recess is less than a diameter of the circular sample recess and is inserted into the circular sample recess when the HT HP sample cell is assembled; or (iii) both (i) and (ii).

5. The HT HP sample cell of claim 1, wherein the compressible, circular internal separator comprises a cross-sectional compression of about 10% to about 30%.

6. The HT HP sample cell of claim 1, wherein the compressible, circular internal separator comprises a fluoroelastomer, silicone, or a nitrile butadiene rubber.

7. The HT HP sample cell of claim 1, wherein the compressible, circular internal separator comprises a combination of vinylidene fluoride, hexafluoropropylene, and tetrafluoroethylene having a durometer of at least 90.

8. The HT HP sample cell of claim 1, wherein the beam entrance window, the beam exit window, or both the beam entrance window and the beam exit window comprises a material and thickness having a neutron transmission of about 50% to about 99% for a neutron beam of wavelength 6 angstroms.

9. The HT HP sample cell of claim 1, wherein the top cell member, the bottom cell member, or both the top cell member and the bottom cell member comprises a titanium alloy, a copper alloy, or an aluminum alloy.

10. The HT HP sample cell of claim 1, comprising:
(i) a maximum working hydrostatic pressure of about 220 MPa;
(ii) a workable temperature range from about −21° C. to about 90° C.; or
(iii) both (i) and (ii).

11. The HT HP sample cell of claim 1, wherein the HT HP sample cell is connected to a supply of pressurized fluid, and wherein the HT HP sample cell is connected to a temperature control member.

12. The HT HP sample cell of claim 11, comprising simultaneous control of the pressure and temperature.

13. The HT HP sample cell of claim 1, wherein the HT HP sample cell is connected to a small angle neutron scattering sample environment, wherein a soft matter liquid sample is disposed within the compressible, circular internal separator member, and wherein the beam entrance window receives an incident beam of neutron radiation, wherein the incident beam of neutron radiation is scattered by the soft matter liquid sample and exits the beam exit window for detection by a detector member.

14. A high-pressure fluid system and radiation beamline sampling environment, comprising:
(a) a control system;
(b) a manifold;
(c) a pressure pump connected to the manifold by tubing;
(d) a supply of pressurizing fluid connected to the pressure pump, wherein the supply of pressurizing fluid is pressurized by the pressure pump;
(e) one or more remotely-controlled pressure valves connected to the pressure pump and manifold by tubing, and wherein the one or more remotely-controlled pressure valves are in communication with the control system;
(f) a sample cell holder in communication with the control system and in which is disposed one or more HT HP sample cells of claim 1, wherein the sample cell holder is configured for equilibrating temperature of the one or more HT HP sample cells;
(g) a source of neutron radiation, wherein activation of the source of neutron radiation causes an incident beam of radiation; and
(h) a radiation detector;
wherein:
(i) the pressure pump causes the supply of pressurizing fluid to enter the manifold, wherein the control system causes the one or more remotely-controlled pressure valves to flow the pressurizing fluid to the one or more HT HP sample cells; or
(ii) the control system causes the sample cell holder to equilibrate the temperature of the one or more HT HP sample cells; or
(iii) both (i) and (ii); and
wherein the control system causes the sample cell holder to translate movement of each of the HT HP sample cells into the incident beam of radiation in succession.

15. The high-pressure fluid system and radiation beamline sampling environment of claim 14, comprising a soft matter liquid sample disposed within each of the HT HP sample cells.

16. The high-pressure fluid system and radiation beamline sampling environment of claim 14, wherein the control system causes the sample cell holder to equilibrate the temperature of a first HT HP sample cell and the pressure control valves to pressurize the first HT HP sample cell.

17. The high-pressure fluid system and radiation beamline sampling environment of claim 16, wherein the incident beam of radiation is scattered by the soft matter liquid sample in a first HT HP sample cell and detected by the radiation detector, and wherein the control system causes the sample cell holder to equilibrate the temperature of a second HT HP sample cell and the pressure control valves to pressurize the second HT HP sample cell, and wherein the control system causes the sample cell holder to move the second HT HP sample cell into the incident beam of radiation.

18. The high-pressure fluid system and radiation beamline sampling environment of claim 14, wherein:
(a) the supply of pressurizing fluid is delivered to one or more of the HT HP sample cells with a maximum hydrostatic pressure of about 220 MPa; or
(b) the temperature of the one or more HT HP sample cells is equilibrated to a temperature in the range of about −21° C. to about 90° C.; or
(c) both (a) and (b).

19. A method of analyzing a soft matter liquid sample under extreme temperature and pressure, comprising:
(a) providing the high-pressure fluid system and radiation beamline sampling environment of claim 14;
(b) disposing a soft matter liquid sample into each of the HT HP sample cells;
(c) equilibrating the temperature of a first of the HT HP sample cells to a temperature from about −21° C. to 90° C., or delivering pressurizing fluid to the first of the HT HP sample cell to reach of pressure of up to about 220 MPa, or both;
(d) translating the first of the HT HP sample cells to a radiation beam position and applying a beam of neutron radiation to the first of the HT HP sample cells; and
(e) detecting a first neutron scattering image from the first of the HT HP sample cells.

20. The method of claim 19, further comprising:
(e) either before, during, or after step (d), equilibrating the temperature of a second of the HT HP sample cells to a temperature from about −21° C. to 90° C., or delivering pressurizing fluid to the second of the HT HP sample cells to reach of pressure of up to about 220 MPa, or both;
(f) detecting a first neutron scattering image from the first of the HT HP sample cells;
(g) translating movement of the second HT HP sample cell into the radiation beam position and applying a beam of neutron radiation to the second of the HT HP sample cells;
(h) detecting a second neutron scattering image from the second of the HT HP sample cells; and
(g) repeating steps c-h at least one time.

* * * * *